US010904790B2

(12) United States Patent
Lee et al.

(10) Patent No.: US 10,904,790 B2
(45) Date of Patent: Jan. 26, 2021

(54) METHOD AND APPARATUS FOR PROCESSING TRAFFIC IN RADIO NETWORK SYSTEM

(71) Applicants: Samsung Electronics Co., Ltd., Suwon-si (KR); SEOUL NATIONAL UNIVERSITY R&DB FOUNDATION, Seoul (KR)

(72) Inventors: Hyung-Ho Lee, Seoul (KR); Sae-Woong Bahk, Seoul (KR); Si-Young Choi, Seoul (KR); Seong-Joon Kang, Seoul (KR); Dong-Yeon Woo, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/043,761

(22) Filed: Jul. 24, 2018

(65) Prior Publication Data
US 2019/0037443 A1 Jan. 31, 2019

(30) Foreign Application Priority Data

Jul. 25, 2017 (KR) .......................... 10-2017-0094359

(51) Int. Cl.
*H04W 28/02* (2009.01)
*H04W 28/08* (2009.01)
(Continued)

(52) U.S. Cl.
CPC ............ *H04W 28/08* (2013.01); *H04L 47/34* (2013.01); *H04W 28/0231* (2013.01); *H04W 80/04* (2013.01); *H04W 92/14* (2013.01)

(58) Field of Classification Search
None
See application file for complete search history.

(56) References Cited

U.S. PATENT DOCUMENTS

2009/0245204 A1* 10/2009 Voyer .................... H04W 36/18
370/331
2009/0296631 A1* 12/2009 Takahashi ........... H04L 12/1881
370/328
(Continued)

OTHER PUBLICATIONS

Huawei, et al., "New Work item on LTE connectivity to 5G-CN," RP-170840 (revision of RP170782), 3GPP TSG RAN Meeting #75, Dubrovnik, Croatia, Mar. 6-9, 2017, 7 pages.
(Continued)

*Primary Examiner* — Duc T Duong

(57) ABSTRACT

The present disclosure provides methods and apparatus relating to a 5G or pre-5G communication system for supporting a higher data rate than that of a 4G communication system, such as long term evolution (LTE). A method for processing traffic at a core network entity processes traffic includes transmitting a message for requesting assistance information to at least one base station, receiving the assistance information from the at least one base station, splitting the traffic based on the received assistance information, and transmitting the split traffic through a core network. A core network entity includes a transceiver and a processor configured to control the transceiver to transmit a message for requesting assistance information to at least one base station, receive the assistance information from the at least one base station, split traffic based on the received assistance information, and transmit data through the split traffic.

20 Claims, 34 Drawing Sheets

(51) Int. Cl.
*H04L 12/801* (2013.01)
*H04W 92/14* (2009.01)
*H04W 80/04* (2009.01)

(56) References Cited

U.S. PATENT DOCUMENTS

| | | | |
|---|---|---|---|
| 2013/0176953 A1* | 7/2013 | Stern-Berkowitz | ......................... H04W 52/146 370/329 |
| 2013/0176988 A1* | 7/2013 | Wang | .................... H04W 28/08 370/331 |
| 2014/0010207 A1* | 1/2014 | Horn | .................. H04W 36/165 370/332 |
| 2014/0293884 A1* | 10/2014 | Larsson | ................ H04L 1/0073 370/329 |
| 2014/0342748 A1* | 11/2014 | Zou | .................. H04W 72/0426 455/452.1 |
| 2016/0057585 A1* | 2/2016 | Horn | .................... H04W 80/02 370/312 |
| 2016/0308776 A1* | 10/2016 | Ozturk | .................. H04L 47/365 |
| 2017/0078890 A1 | 3/2017 | Zhu et al. | |
| 2017/0099214 A1 | 4/2017 | Border et al. | |
| 2017/0111825 A1 | 4/2017 | Babaei | |
| 2017/0111911 A1* | 4/2017 | Uchino | .................. H04W 28/16 |
| 2017/0164234 A1* | 6/2017 | Kalapatapu | ........... H04W 28/10 |
| 2017/0359855 A1* | 12/2017 | Jiao | ..................... H04W 92/045 |
| 2018/0206173 A1* | 7/2018 | Virtej | .................... H04W 40/02 |
| 2018/0206282 A1* | 7/2018 | Singh | .................... H04W 88/06 |
| 2018/0227723 A1* | 8/2018 | Takahashi | ............... H04W 4/24 |
| 2019/0014501 A1* | 1/2019 | Fotiadis | ................ H04W 24/10 |
| 2019/0297523 A1* | 9/2019 | Basu Mallick | ... H04W 28/0278 |
| 2020/0053809 A1* | 2/2020 | Axelsson | .............. H04L 9/0819 |

OTHER PUBLICATIONS

NTT DOCOMO, Inc., "New WID on New Radio Access Technology," RP-170855, 3GPP TSG RAN Meeting #75, Dubrovnik, Croatia, Mar. 6-9, 2017, 8 pages.

SA WG2, "New WID: 5G System Architecture—Phase 1," TD SP-160958, 3GPP TSG SA Meeting #74, Vienna, Austria, Dec. 7-9, 2016, 8 pages.

SA WG2, "EPC support for Option 3/3a/3x Dual Connectivity with New Radio (EDCE5)," TD SP-170058, 3GPP TSG SA Meeting #75, Dubrovnik, Croatia, Mar. 8-10, 2017, 4 pages.

* cited by examiner

METHOD AND APPARATUS FOR PROCESSING TRAFFIC IN RADIO NETWORK SYSTEM

CROSS-REFERENCE TO RELATED APPLICATIONS AND CLAIM OF PRIORITY

This application claims the priority under 35 U.S.C. § 119(a) to Korean Patent Application Serial No. 10-2017-0094359, which was filed in the Korean Intellectual Property Office on Jul. 25, 2017, the entire content of which is hereby incorporated by reference.

BACKGROUND

1. Field

The present disclosure relates to a technique for transmitting and receiving data in a wireless communication system and, in particular, to a technique for splitting and reordering traffic transmission.

2. Description of Related Art

In order to meet wireless data traffic demands that have increased after the commercialization of $4^{th}$ Generation (4G) communication systems, efforts to develop an improved $5^{th}$ Generation (5G) communication system or a pre-5G communication system have been made. For these reasons, the 5G communication system or the pre-5G communication system is called a beyond 4G network communication system or a post-LTE system.

In order to achieve a high data transmission rate, implementation of the 5G communication system at a mmWave (super-high frequency) band (e.g., such as a 60 GHz band) is being considered. In the 5G communication system, technologies such as beamforming, massive multi-input multi-output (MIMO), full dimensional MIMO (FD-MIMO), array antenna, analog beam-forming, and large scale antenna are discussed to obviate a path loss of a radio wave and increase a transmission distance of a radio wave at the super-high frequency band.

Further, for performance improvement in a network system, various technologies, such as an evolved small cell, an advanced small cell, a cloud radio access network (cloud radio access network (RAN)), an ultra-dense network, device-to-device communication (D2D), a wireless backhaul, a moving network, cooperative communication, coordinated multi-points (CoMP), and interference cancellation have been developed for the 5G communication system.

In addition, advanced coding modulation (ACM) schemes, such as hybrid FSK and QAM modulation (FQAM) and sliding window superposition coding (SWSC), and advanced access technologies, such as filter bank multi carrier (FBMC), non-orthogonal multiple Access (NOMA), and sparse code multiple access (SCMA) also have been developed for the 5G communication system.

SUMMARY

The present disclosure provides a method and apparatus for splitting traffic on a core network side and reordering the split traffic at a user equipment (UE) side.

In addition, the present disclosure provides a method and apparatus for preventing dual connectivity (DC) from being disabled in the entire system when a transmission and reception failure occurs at any one of base stations.

Also, the present disclosure provides a technique of utilizing a traffic splitting and reordering layer (TSRL) at a core network side and a UE side to realize the above-described method.

In one aspect, a method for processing traffic at a core network entity includes transmitting an assistance information request message to at least one base station, receiving assistance information from the at least one base station, splitting the traffic based on the received assistance information, and transmitting the split traffic through a core network.

The core network entity may be a gateway or a user plane function (UPF).

The splitting of the traffic may be implemented at a traffic splitting and reordering layer (TSRL) of the core network entity.

The assistance information may include at least one of a transmission delay time, a queue size, or a transmission size.

The method further may include determining a split ratio for splitting the traffic based on the received assistance information.

The method further include adding into the split data information indicating a sequence number (SN) associated with an operation of the traffic splitting.

In another aspect, a core network entity includes a transceiver configured to transmit and receive data, and a controller configured to cause the transceiver to transmit an assistance information request message to at least one base station, to receive assistance information from the at least one base station, to split data based on the received assistance information, and to transmit the split traffic to the at least one base station.

The core network entity may be a gateway or a UPF.

The controller may be further configured to cause the transceiver to split the traffic using a TSRL of the core network entity.

The assistance information may include at least one of a transmission delay time, a queue size, or a transmission size.

The controller may determine a split ratio for splitting the traffic based on the received assistance information.

The transmitted traffic may further include information indicating an SN associated with the traffic splitting.

In another aspect, a method for supporting a traffic flow management in a wireless network system includes receiving, by a base station, a request for assistance information to be used for splitting traffic from a core network entity, generating the assistance information in response to the received assistance information request; and transmitting the generated assistance information to the core network entity in which the traffic is split based on the assistance information.

The method may further include receiving at least one portion of split traffic from the core network entity; and transmitting the received split traffic to a UE.

The traffic splitting may be implemented at a TSRL of the core network entity.

Packets of the split traffic may be reordered at a TSRL of the UE.

In another aspect, a base station supporting a traffic flow managment in a wireless network system, includes a transceiver configured to transmit and receive data, and a controller configured to cause the transceiver to receive a request for assistance information to be used for splitting traffic from a core network entity, to generate the assistance information in response to the received assistance information request, and to transmit the generated assistance information to the core network entity in which the traffic is split based on the assistance information.

The controller may be further configured to cause the transceiver to receive split at least one portion of the split traffic from the core network entity, and transmit the at least one portion of split traffic to a UE.

The traffic splitting may be implemented at a TSRL of the core network entity.

Packets of the split traffic may be reordered at a TSRL of the UE.

As described above, the present disclosure may enable multipath simultaneous transmission through traffic splitting for DL traffic in a core network entity such as a gateway in a 4G network or a user plane function (UPF) in a 5G network. In addition, a UE according to another aspect of the present disclosure may enable multipath simultaneous transmission through traffic splitting for UL traffic. The present disclosure may prevent or mitigate traffic concentration at a master RAN node (e.g., MeNB) by performing traffic splitting in a core network. The present disclosure may prevent or mitigate the congestion of data link between a core network entity and a master RAN node (e.g., MeNB).

The present disclosure may provide a protocol and function that ensures sequential transmission of data when a plurality of paths are used to transmit data simultaneously. The present disclosure may enable sequential packet transmission while simultaneously using multiple paths, so that performance degradation due to excessive out-of-delivery in multipath transmission may be avoided, thereby effectively increasing a TCP throughput of a single IP flow.

A traffic splitting entity (e.g., gateway or UPF) according to another aspect of the present disclosure may collect information that can be referenced in traffic splitting on each transport path. A wireless network system according to another aspect of the present disclosure may provide assistance information request and reporting procedures to support a traffic splitting function that performs traffic splitting based on the collected information. The traffic splitting entity according to another aspect of the present disclosure may provide a report request procedure that supports an event triggering report to enable tracking of changes in path performance metrics with minimal assistance information. The present disclosure may provide details of various methods and procedures for implementing assistance information request and reporting. This variable and flexible option allows mobile carriers to select and adjust an optimal method according to the cell arrangement state and progress of the mobile carriers.

A traffic splitting algorithm according to another aspect of the present disclosure may adjust an amount of split traffic via a plurality of paths so that temporary performance changes of one path or a plurality of paths may be normally absorbed by another path. That is, the present disclosure may provide an adaptive traffic splitting algorithm. Also, the traffic splitting algorithm may distribute the traffic in a harmonic manner with minimal feedback of the assistance information.

The present disclosure may enable mobile carriers to avoid excessive installation of an interface between RAN nodes by enabling traffic splitting in a core network entity (e.g., GW or UPF) and designing assistance information request and reporting procedures for traffic splitting function, thereby achieving a cost reduction. That is, the present disclosure may provide an efficient solution in terms of cost for the traffic splitting function.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
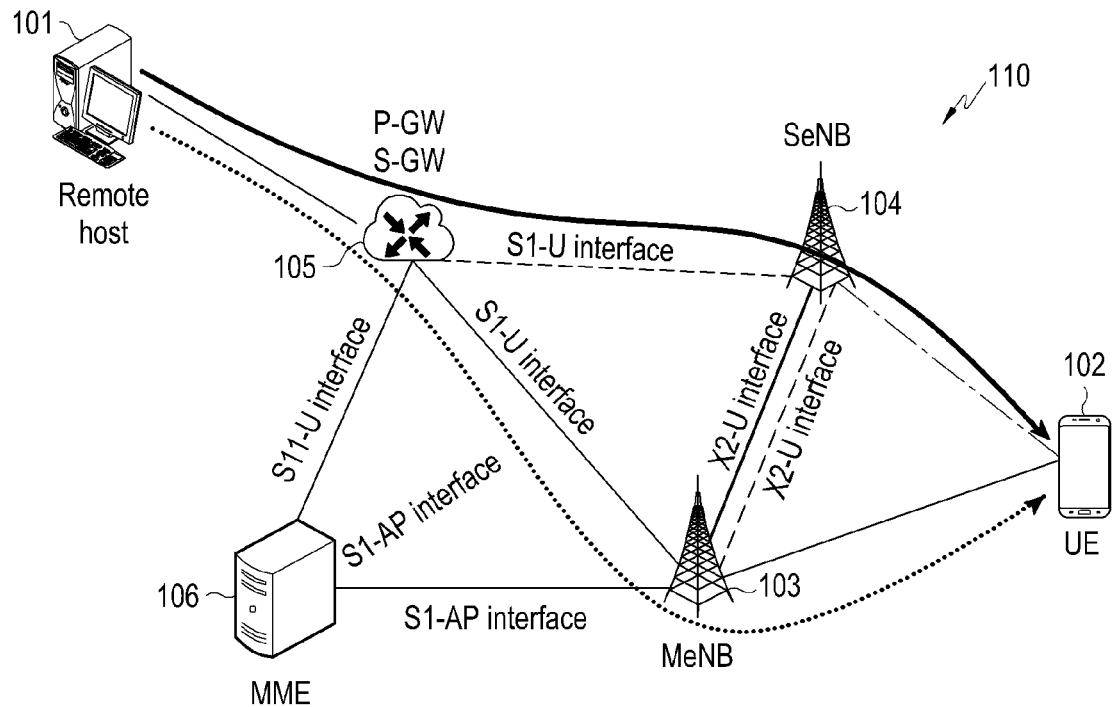
FIGS. 1A and 1B are diagrams illustrating various exemplary embodiments of a dual connectivity (DC) structure.

FIGS. 1A through 37, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

Before a detailed description of the present disclosure, it should be noted that, although the terms "ordinal numbers" such as first, second and the like are used to describe various constituent elements, the constituent elements should not be defined by the terms. The terms are used merely for the purpose to distinguish an element from the other elements. As used herein, the singular forms are intended to include the plural forms as well, unless the context clearly indicates otherwise. In the entire specification of the present application, when it is described that a certain unit "includes" a certain element, this means that the unit may include any other element rather than exclude the any other element unless otherwise described. Further, the term "~ unit" as used herein means a software or hardware component, such as a field-programmable gate array (FPGA) or an application specific integrated circuit (ASIC), and the "~ unit" performs certain functions. However, the "~ unit" does not always have a meaning limited to software or hardware. The "~ unit" may be configured either to be stored in an addressable storage medium or to execute one or more processors.

Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "~ unit" may be combined into a smaller number of elements or "~ units", or may be further divided into a large number of elements or "~ units".

A dual connectivity structure in the 5G communication system refers to a method in which a user equipment (UE) uses radio resources provided from at least two or more different network nodes (master and secondary base stations or macro and small base stations) connected via non-ideal backhaul in a radio resource control (RRC) connected state. Compared to a carrier aggregation method in which a transmission delay time is minimally considered when a base station and a remote radio head (RRH) are connected, the dual connectivity structure requires consideration of a transmission delay time between base stations. Through the dual connectivity, a method in which a UE aggregates radio resources to increase a throughput of a user side is under discussion.

A traffic splitting and reordering layer (TSRL) payload in the present disclosure may be referred to as a TSRL service data units (SDU), a packet data convergence protocol (PDCP) payload may be referred to as a PDCP SDU, and a PDCP packet may be referred to as a PDCP PDU.

Figure 1B:
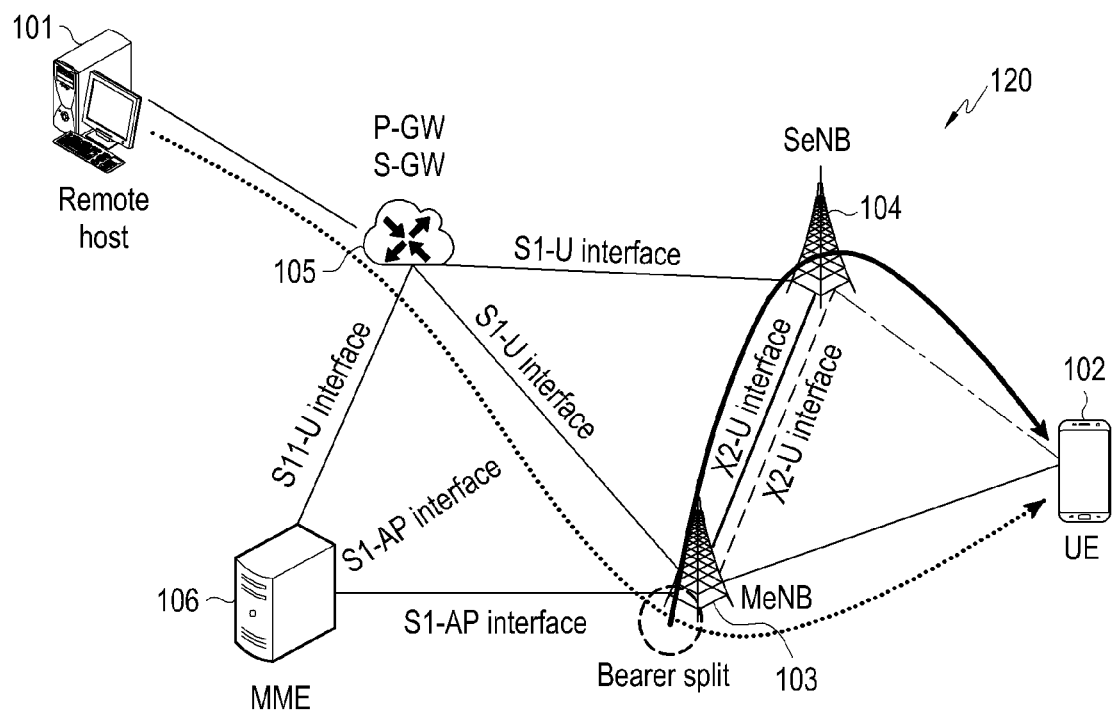

FIGS. 1A and 1B are exemplary diagram illustrating various embodiments of a dual connectivity (DC) structure.

A first DC structure 110 and a second DC structure 120 may include a wireless host 101, a user equipment (UE) 102, an MeNB 103, an SeNB 104, a gateway 105, and a mobility management entity (MME) 106, and may include only some of the components 101 to 106 according to selection and/or needs. Meanwhile, the first DC structure 110 may be a DC-1A scenario, and the second DC structure 120 may be a DC-3C scenario.

In the case of the first DC structure 110, a path to be used for transmitting and receiving data may be selected, which may be referred to as steering. For example, the MME 106 may select a path associated with a first base station (e.g., MeNB 103) or a path associated with a second base station (e.g., SeNB 104) based on the network conditions of the base stations 103 and 104. Meanwhile, the MME 106 has a session management role, which is related to setting a bearer by end-to-end. When the bearer is set, a packet flows to the set bearer.

In the case of the second DC structure 120, it is possible to perform traffic splitting at a master radio access network (RAN) node 103 (e.g., MeNB). A specific operation of the second structure 102 is as follows.

In the second DC structure supporting a splitting bearer, splitting bearer mapping of downlink (DL) traffic at the master RAN node 103 may be performed. Here, the split bearer may refer to a bearer split by a traffic split function of the master RAN node 103. Next, two separate traffic flows in an original traffic flow may be transmitted simultaneously through the master RAN node and a secondary RAN node 104 (e.g., SeNB). On the other hand, a greater number of secondary RAN nodes 104 may be connected to the master RAN node 103 to increase the likelihood of utilizing DC as the splitting bearer.

However, when the greater number of secondary RAN nodes 104 are connected to the master RAN node 103, an S1-U interface needs to provide a greater bandwidth to avoid congestion between the master RAN node 103 and the gateway 105 serving the secondary RAN node 104. Assuming that an amount of traffic to be serviced is proportional to the number of connected secondary RAN nodes 104, a required bandwidth of the S1-U interface is proportional to the number of connected RAN nodes including the master RAN node 103 and the secondary RAN node 104. Here, the S1-U interface refers to an interface that provides GTP tunneling per bearer as a user plane, as an interface between a base station (i.e., master RAN node 103 or secondary RAN node 104) and an S-GW 105. When the bandwidth of the S1-U interface is insufficient to handle the amount of traffic, congestion may occur in the S1-U interface. When congestion occurs in the S1-U interface, end-to-end (E2E) performance of the traffic transmitted using the master RAN node 103 or the secondary RAN node 104 may be degraded.

When a flow control through the interface between the master RAN node 103 and the secondary RAN node 104 is performed, it is necessary to ensure that a transmission buffer of the secondary RAN node 104 does not overflow or does not experience the overflow in order for the flow control to be performed properly. To this end, the secondary RAN node 104 needs to request a packet burst from the master RAN node 103. Here, for the request, the secondary RAN node 104 notifies the master RAN node 103 of an amount of expected packets and receives desired information from the master RAN node 103. As long as the secondary RAN node 104 continues to provide the splitting bearer, the secondary RAN node 104 may repeat a traffic request. The flow control is based on traffic requests and responses. A request/response-based flow control mechanism allows for high granularity of the flow control, but signaling overhead between RAN nodes (e.g., master RAN node 103) associated with the flow control may increase.

When the flow control through the interface between the master RAN node 103 and the secondary RAN node 104 is performed as in the case of the second DC structure 120, traffic flow control may be performed in such a manner that the secondary RAN node 104 makes a traffic request from the master RAN node 103 and the master RAN node 103 responds to the request from the secondary RAN node 104. Since the secondary RAN node 104 considers only a path between the secondary RAN node 104 and the UE 102 without considering a path between the master RAN node 103 and the UE 102, it may be difficult to adjust a load balance between the master RAN node 103 and the secondary RAN node 104 through this traffic flow control method.

Figure 2:
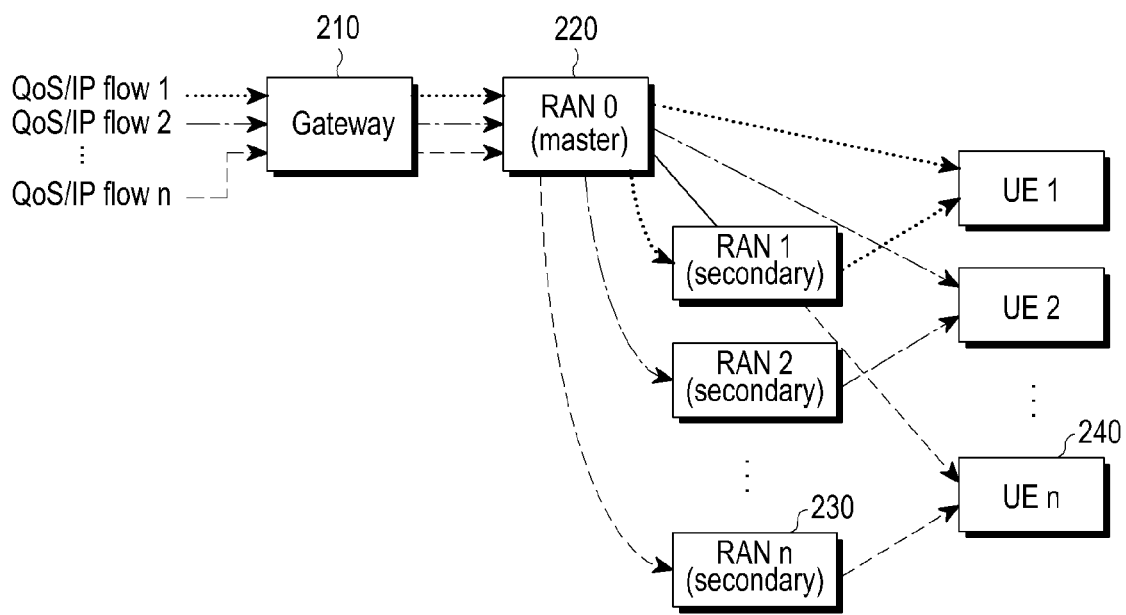
FIG. 2 is an exemplary diagram illustrating one embodiment of a DC structure of FIG. 1B.

FIG. 2 is an exemplary diagram illustrating one embodiment of the second DC structure 120 of FIG. 1.

Referring to FIG. 2, a master RAN node 220 (e.g., MeNB) may perform a traffic split function. When the master RAN node 220 performs the traffic split function, a risk of a single point of failure may increase because all traffic need to pass through the master RAN node 220. When an operational problem temporarily occurs in the master RAN node 220, the operational problem of the master RAN node 220 is propagated to all the secondary RAN nodes 230 (e.g., RAN 1 to RAN n) connected to the master RAN node 220 so that the connection of a UE 240 (e.g. UE 1 to UE n) connected to the master RAN node 220 and the secondary RAN node 230 via the DC may be completely stopped. That is, a system of FIG. 2 (i.e., second DC structure 120) may have a risk of disconnection due to the use of the single point of failure (e.g., master RAN node 220).

Figure 3:
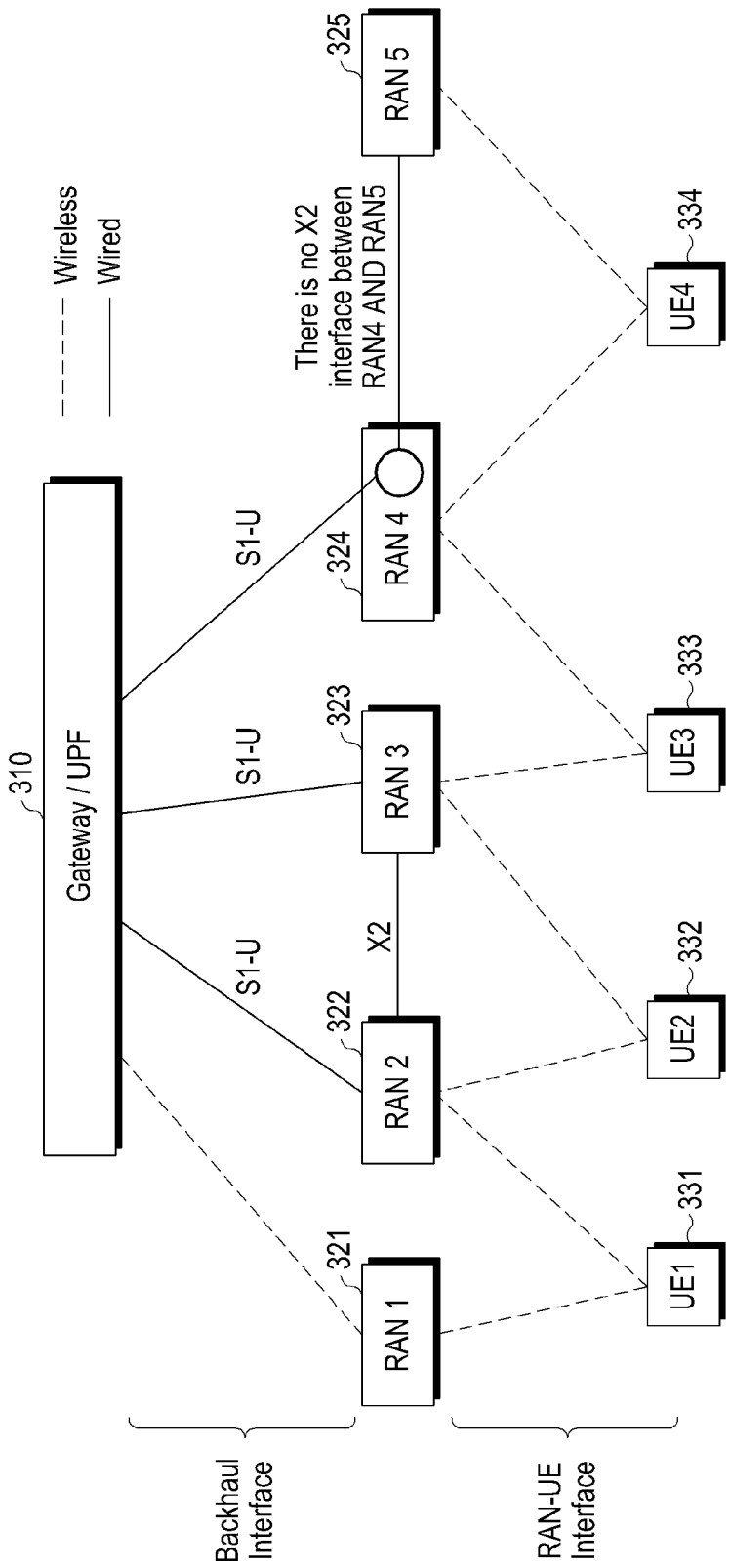
FIG. 3 is an exemplary diagram illustrating a backhaul link between a radio access network (RAN) node and a gateway.

FIG. 3 is an exemplary diagram illustrating a backhaul link between a RAN node and a gateway.

As a direct approach to avoid the above-mentioned traffic concentration at the master RAN node when a plurality of small cells exist, a RAN node corresponding to the small cell can be directly connected to a gateway. Although the above approach is simple, a backhaul link needs to be installed between each RAN node and the gateway, so there may be a scalability problem (i.e., a cost aspect) in that the total cost of the backhaul installation increases in proportion to the number of connected RAN nodes.

FIG. 3 illustrates a method utilizing a wireless backhaul instead of a wired backhaul between a user plane gateway and RAN nodes 321 to 325 in order to solve the scalability problem that may occur when the above-mentioned plurality of small cells exist.

A UE1 331 may be connected to a RAN1 321 and a RAN2 322. The RAN1 321 is connected to a gateway 310 (or UPF of 5G network) by a wireless link such as a mmWave (super-high frequency) link, and the RAN2 322 may be connected to a gateway by a wired link. A UE2 332 may be connected to the RAN2 322 and a RAN3 323 which are connected to each other by an X2 interface. Accordingly, the UE2 332 may be set to have the second DC structure 120 described above with reference to FIG. 1.

When an inter-node interface such as the X2 interface is to be installed in a 4G network, it is necessary to support complex configuration and management function between RAN nodes. In order to avoid this problem, an RAN5 325 may be connected to the gateway 310 via a router or a switch disposed in an RAN4 324, instead of the absence of an (RAN) inter-node interface between the RAN5 325 and the RAN4 324. Since the above-described arrangement may be achieved with only a simple plug-in type that reuses existing backhaul and installs a commercial communication cable, such as a LAN, to establish a link between the router and the RAN node, the above-described arrangement may be more cost effective than the existing arrangement along with an increase in the number of RAN nodes 321 to 325 to be connected to the gateway 310.

Figure 4:
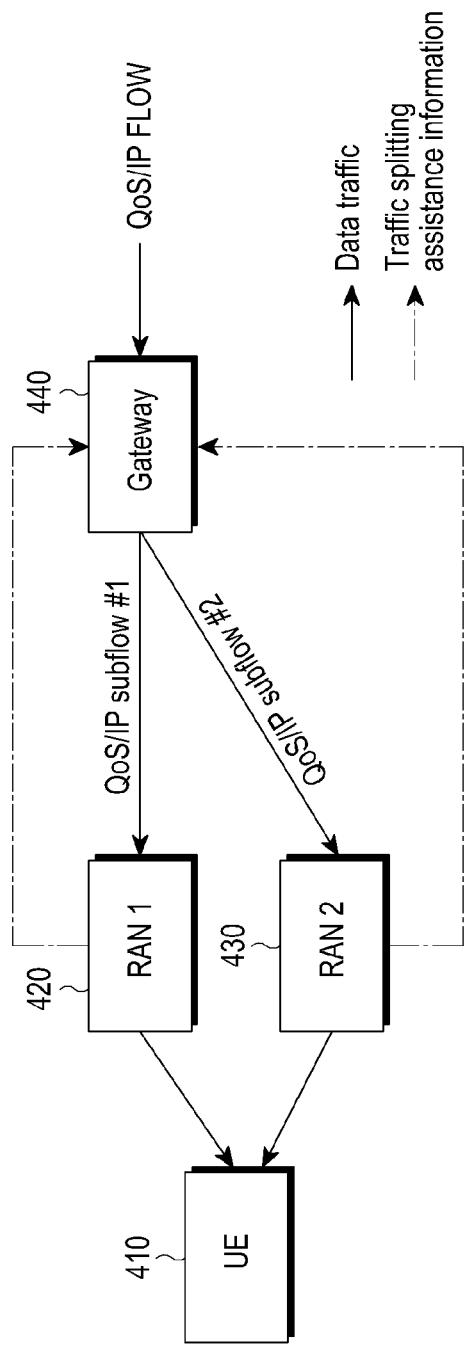
FIG. 4 is an exemplary diagram illustrating one embodiment of a DC structure according to one aspect of the present disclosure.

FIG. 4 is a diagram illustrating one embodiment of a DC structure according to another aspect of the present disclosure.

Solid line paths shown in FIG. 4 indicate data traffic (data flow), and dotted line paths indicate a flow of traffic split assistance information necessary for a gateway (or core network) to split and transmit data (or traffic data).

Referring to FIG. 4, a gateway 440 (i.e., an entity on the core network side) may split and transmit received data to a plurality of RAN nodes 420 and 430 (or base station). In addition, the data split and transmitted to the plurality of RAN nodes 420 and 430 may be reordered by a UE 410. For reference, although only the two RAN nodes 420 and 430 are illustrated in FIG. 4, this is only for convenience of description. Obviously, there may be a large number of RAN nodes in an actual system.

In a wireless network system according to another aspect of the present disclosure, a core network 440 side other than base stations 420 and 430 side performs traffic splitting. Thereby, in a mobile communication network supporting a multi-radio access technology (RAT), data traffic may be transmitted to a UE by using heterogeneous RATs simultaneously without dependency between the heterogeneous RATs. That is, it is possible to prevent such a problem that traffic data transmission/reception through other base stations becomes impossible even though only one of the plurality of eNBs 420 and 430 has a trouble in the transmission/reception function.

The present disclosure provides a protocol and algorithm for splitting a traffic flow into one or a plurality of paths. In addition, the present disclosure provides traffic splitting of a single traffic flow at a core network node such as a gateway (GW) of a 4G network or a user plane function (UPF) of a 5G network. To this end, the present disclosure provides a network architecture and protocol that supports a splitting bearer. Accordingly, traffic splitting does not need to be performed by RAN nodes 420 and 430 such as MeNB or SeNB. In addition, the present disclosure provides a method of splitting a single traffic into multiple paths, performing, by a gateway 440 (e.g., GW, UPF, etc.), traffic splitting on downlink (DL) traffic, performing, by the UE 410, traffic splitting on uplink (UL) traffic, performing assistance information reporting procedures for supporting traffic splitting with minimum signaling overhead for performance optimization, and performing, by the UE 410, reordering for sequential transmission of packets received through the multiple paths.

Figure 5:
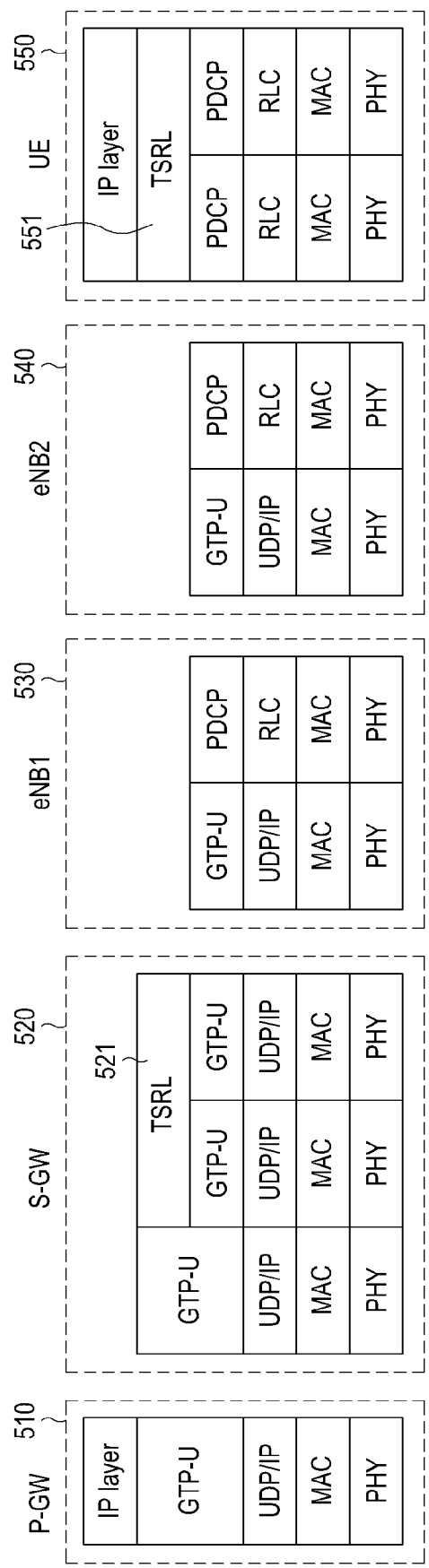
FIG. 5 is an exemplary diagram illustrating one embodiment (Option 1) of a communication protocol stack according to another aspect of the present disclosure.

In order to support the above-described functions, the present disclosure provides a method of using a TSRL 560 to create a tunnel between a UE 550 and a gateway 520 (e.g., serving GW) as shown in FIG. 5. Meanwhile, although FIG. 5 shows that a TSRL 521 is configured in the S-GW 520, this is merely an example, and the TSRL 521 may be configured in a different type of gateway other than the S-GW 520. Also, in the case of a 5G network, the TSRL may be configured in a UPF.

Specifically, a TSRL transmitting (TX) entity may split a traffic flow into one or more traffic sub-flows. Here, each traffic sub-flow may be transmitted through a network-related path, and the TSRL TX entity may correspond to the S-GW 520 in case of downlink (DL) and correspond to the UE 550 in case of uplink (UL).

In terms of DC, another traffic sub-flow may be transmitted through another cell. The UE 550 may receive traffic of each sub-flow from one or more cells. Here, the UE 550 may simultaneously transmit and receive packets through the multiple paths in which each path corresponds to at least one RAT, and in terms of DC, the UE 550 has a function to support dual connectivity. Also, the multiple paths may correspond to the same or different types of RATs, respectively.

Meanwhile, the packets of each sub-flow may be transmitted to a TSRL receiving (RX) entity. The TSRL RX entity may perform reordering to sequentially transmit the reordered data to an upper layer.

The present disclosure provides two protocol stack options that support traffic splitting and reordering in a core network gateway as follows.

Option 1: Establish a tunnel between a core network entity (e.g., GW or UPF) and a UE by introducing a TSRL. A transmission side performs traffic splitting on the end point of the tunnel and a reception side reorders traffic.

Option 2: Adjust sequence numbers of packets transmitted through the multiple paths to support traffic splitting and reordering. Option 2 may be applied as Option 2-1 and Option 2-2 which will be described in the next part of description of Option 2.

FIG. 5 is an exemplary diagram illustrating one embodiment (Option 1) of a communication protocol stack according to another aspect of the present disclosure. Hereinafter, Option 1 will be described.

As shown in FIG. 5, TSRLs 521 and 551, which are new layers, are introduced between the S-GW 520 and the UE 550. Meanwhile, although FIG. 5 shows that the TSRL 521 is configured in the S-GW 520, this is merely an example, and the TSRL 521 may be configured in a different type of gateway other than the S-GW 520. Also, a 5G network may be configured in a UPF. A TSRL TX entity may constitute a TSRL PDU consisting of a TSRL header and a TSRL payload. The configuration of the TSRL PDU will be described in detail with reference to FIG. 6.

A TSRL RX entity may perform reordering of packets received from a lower layer (e.g., PDCP) using a TSRL sequence number (SN). Here, the TSRL RX entity may correspond to the UE 550 in case of DL and correspond to the S-GW 520 in case of UL.

In addition, in regard to DL traffic, the TSRL 560 of the S-GW 520 may receive data (e.g., IP packets) from an upper layer (e.g., IP), and may configure a TSRL PDU based on the received data to transmit the configured TSRL PDU to a lower layer (e.g., GTP-U).

Figure 6:
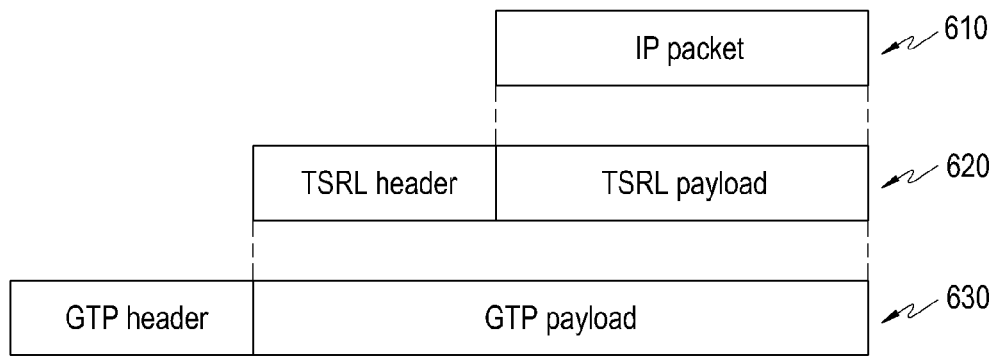
FIG. 6 is an exemplary diagram illustrating an IP packet, a traffic splitting and reordering layer (TSRL) packet data unit (PDU), and a GTP PDU according to another aspect of the present disclosure.

FIG. 6 is an exemplary diagram illustrating an IP packet, a TSRL PDU, and a GTP PDU according to another aspect of the present disclosure.

As illustrated in FIG. 6, a TSRL PDU 620 may include a TSRL header and a TSRL payload, where the TSRL payload may refer to an IP packet 610. The TSRL header may include a TSRN SN indicating a sequence number of a TSRL PUD (e.g., a TSRL packet).

In addition, a GTP PDU 630 may include a GTP payload and a GTP header, where the GTP payload may refer to a TSRL PDU 620.

Meanwhile, the TSRL payload in this disclosure may be referred to as a TSRL SDU, the GTP payload may be referred to as a GTP SDU, the TSRL packet may be referred to as a TSRL PDU, and a GTP packet may be referred to as a GTP PDU.

As illustrated in FIGS. 5 and 6, the TSRL 521 of the S-GW 520 performs traffic splitting on incoming traffic so that outgoing traffic is transmitted via one or a plurality of paths, and each path may correspond to a different GTP-U tunnel. In the case of traffic splitting, the TSRL 521 of the S-GW may set an SN in the TSRL header of the TSRL packet so that an SN between the GTP PDU 630 (e.g., GTP-U packet) via an S5/S8 interface and a GTP PDU via an S1 interface may be mapped. In this case, the TSRL SN may be divided into an SN space for the S1 interface of a first path and an SN space for the S1 interface of a second path. A diversity effect may be used by duplicating a packet received from the TSRL 521 of the S-GW and transmitting the duplicated packet through one or more paths. On the other hand, the SNs of successive GTP PDUs in the same path may be continuous, such as a general GTP-U packet stream.

Figure 7:
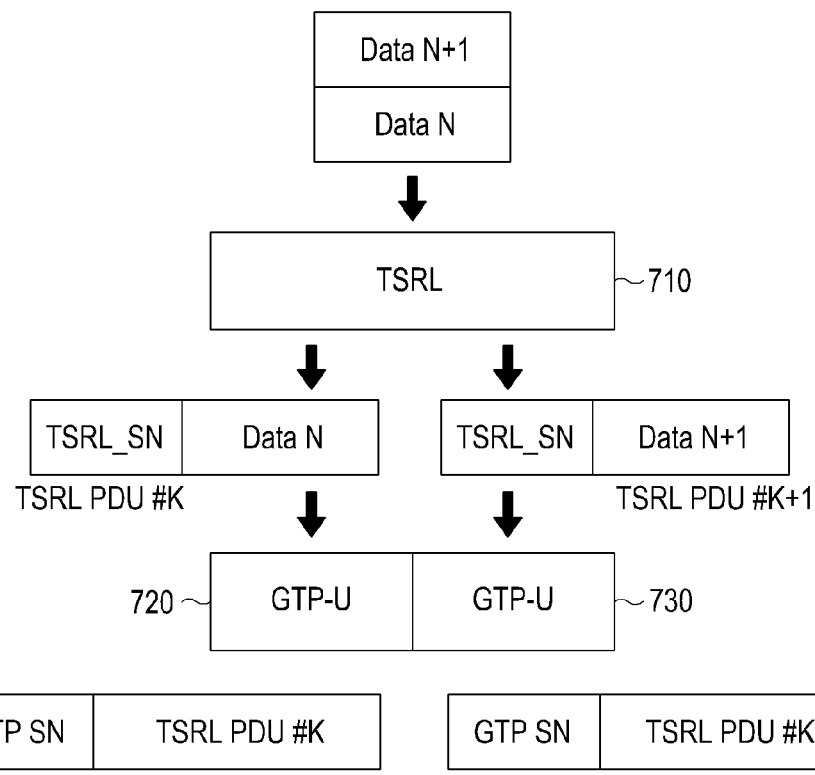
FIG. 7 is an exemplary diagram illustrating one embodiment of a method of transmitting split data using a plurality of GTP-U tunnels according to another aspect of the present disclosure.

FIG. 7 is an exemplary diagram illustrating one embodiment of a method of transmitting split data using a plurality of GTP-U tunnels according to another aspect of the present disclosure.

As illustrated in FIG. 7, a TSRL 710 may split sequentially incoming data and may transmit the split data to each of a plurality of GTP-U 720 and 730. For example, the left GTP-U 720 may correspond to an eNB1 and the right GTP-U 730 may correspond to an eNB2. The PDCP SNs of successive PDCP packets of the same path may be continuous.

Meanwhile, the plurality of GTP-U 720 and 730 may add a GTP header to the TSRL PDU (or GTP payload) received from the TSRL 710, and the GTP header may include a GTP SN. Here, the GTP header added to the TSRL PDU may be referred to as a GTP PDU.

Figure 8:
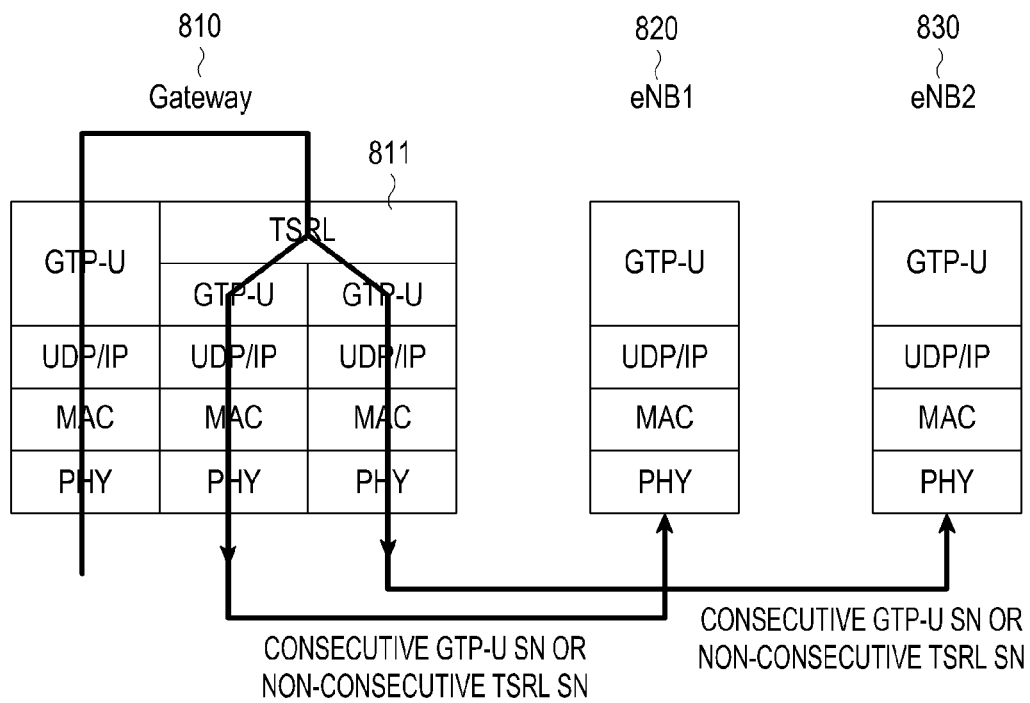
FIG. 8 is an exemplary diagram illustrating one embodiment of traffic splitting according to another aspect of the present disclosure.

FIG. 8 is an exemplary diagram illustrating one embodiment of traffic splitting according to another aspect of the present disclosure.

In particular, FIG. 8 illustrates DL traffic splitting between a core network entity 810 (e.g., gateway or UPF) and a plurality of eNBs 820 and 830 (e.g., eNB1, eNB2, etc.). When a PDCP SDU is transmitted to an upper layer, the PDCP may indicate a COUNT value associated with the PDCP SDU.

Figure 9:
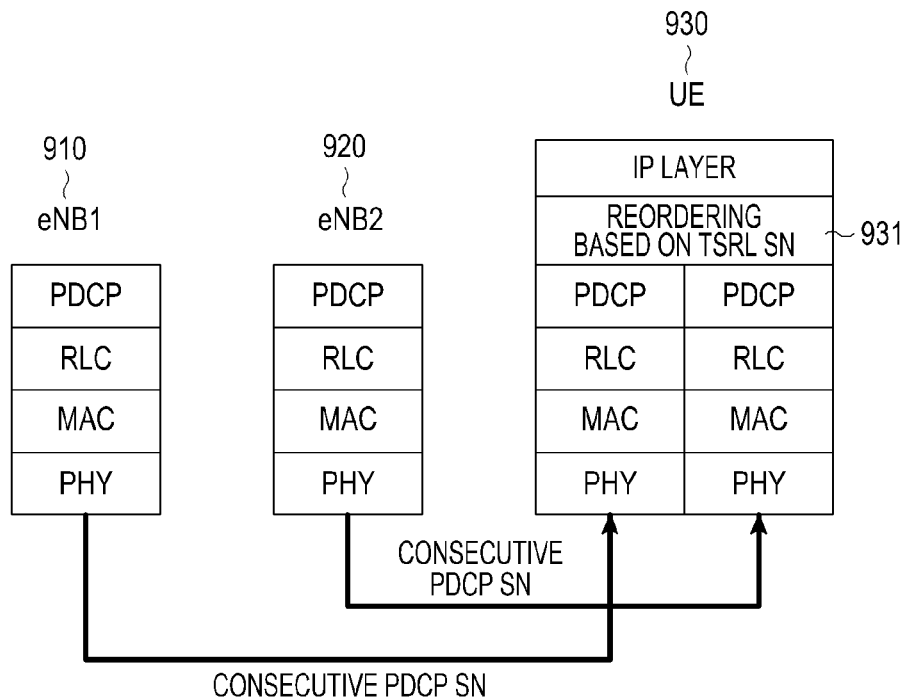
FIG. 9 is an exemplary diagram illustrating one embodiment of a reordering method according to another aspect of the present disclosure.

FIG. 9 is an exemplary diagram illustrating one embodiment of a reordering method according to another aspect of the present disclosure. In particular, FIG. 9 illustrates a configuration for reordering PDCP SDUs based on a TSRL SN of a TSRL at a UE 930 (reordering of PDCP SDUs, based on TSRL SN at UE TSRL). As described above, the UE 930 may perform reordering similar to a method of TS 36.323 section 5.1.2.1.4. For example, the UE 930 may perform reordering of PDCP SDUs based on a COUNT value indicated in the TSRL. In regard to UL traffic, when data (e.g., an IP packet) is received from an upper layer, the TSRL at the UE 930 may configure a TSRL PDU and transmit the configured TSRL PDU to a lower layer.

Figure 10:
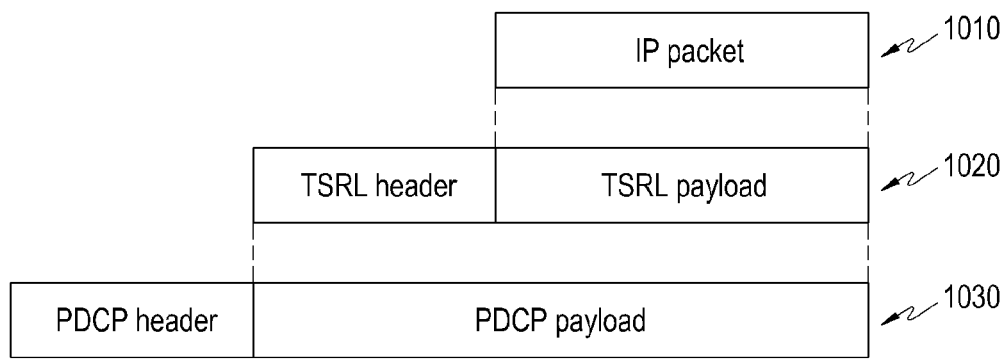
FIG. 10 is an exemplary diagram illustrating an IP packet, a TSRL PDU, and a PDCP PDU according to another aspect of the present disclosure.

FIG. 10 is an exemplary diagram illustrating an IP packet, a TSRL PDU, and a PDCP PDU according to another aspect of the present disclosure.

As illustrated in FIG. 10, a TSRL PDU 1020 may carry an IP packet 1010, and a PDCP PDU 1030 may carry the TSRL PDU 1020. Meanwhile, the TSRL PDU 1020 may be referred to as a TSRL packet, and the PDCP PDU 1030 may be referred to as a PDCP packet.

The TSRL at the UE performs traffic splitting on incoming traffic so that outgoing traffic is transmitted via one or a plurality of paths, where each path may correspond to a different PDCP entity. For traffic splitting, the TSRL at the UE may set an SN in a header of a TSRL packet to map an SN between the incoming packet and a PDCP SDU. The total SN space for the PDCP SDU may be divided into an SN space for a PDCP SDU for a first path and an SN space for a PDCP SDU for a second path. That is, some of the total bits may be allocated for each PDCP SDU. An eNB associated with a DC method according to another aspect of the present disclosure may perform SN mapping between a GTP-U packet and a PDCP packet. At this time, an SN gap between adjacent PDCP packets may be maintained through an SN gap between adjacent GTP-U packets via an S1 interface. A diversity effect may be used by duplicating a packet coming from the TSRL of the UE and transmitting the duplicated packet through one or more paths. A GTP-U of an S-GW may indicate a COUNT value associated with the GTP-U packet when a GTP-U payload is transmitted to an upper layer. The TSRL of the S-GW performs reordering of the GTP-U payload based on the indicated COUNT value. Here, a method of performing reordering may be performed in a similar manner to the reordering function specified in TS 36.323 section 5.1.2.1.4.

Hereinafter, another embodiment (Option 2) of the communication protocol stack according to another aspect of the present disclosure will be described.

A TSRL does not create a TSRL packet, but may perform traffic splitting and packet reordering based on adjusted SNs in multiple paths. When multiple paths are used for one traffic flow, GTP-U packet SNs of one path may be discontinuous. When a packet stream is split into a plurality of packet streams, SNs used in the plurality of packet streams constitute a continuous SN. When traffic is transmitted from a reception interface to a transmission interface (e.g., Uu to/from S1-U at eNB), an SN gap in arbitrary neighboring packets from the reception interface is maintained, so that the transmitted traffic may be identified in an SN gap of adjacent packets to be transmitted. A diversity effect may be used by duplicating a packet coming from a TSRL transmission entity and transmitting the duplicated packet through one or more paths.

Figure 11:
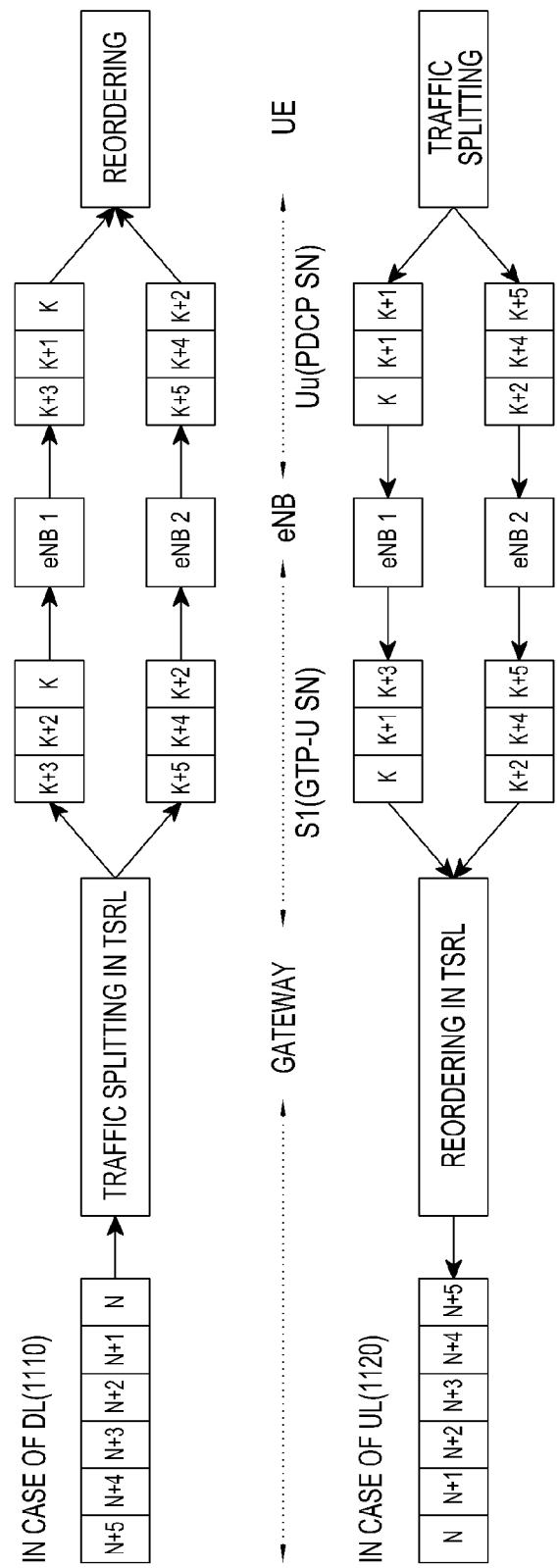
FIG. 11 is an exemplary diagram illustrating one embodiment of a method of splitting and reordering packets in a gateway and a TSRL of a UE according to another aspect of the present disclosure.

FIG. 11 is an exemplary diagram illustrating one embodiment of a method of splitting and reordering packets in a gateway and a TSRL of a UE according to another aspect of the present disclosure. Meanwhile, operations described with reference to FIG. 11 may be performed by a UPF in the case of a 5G network.

Meanwhile, FIG. 11 illustrates a configuration of performing negotiated SN numbering between GTP-U packets and PDCP packets. For example, as illustrated in FIG. 11, only odd-numbered packets may be transmitted through an eNB1, and only even-numbered packets may be transmitted through an eNB2. However, this is merely one example, and criterion for splitting or allocating the packets may be preset or may be flexibly changed depending on the state of a network.

Figure 12:
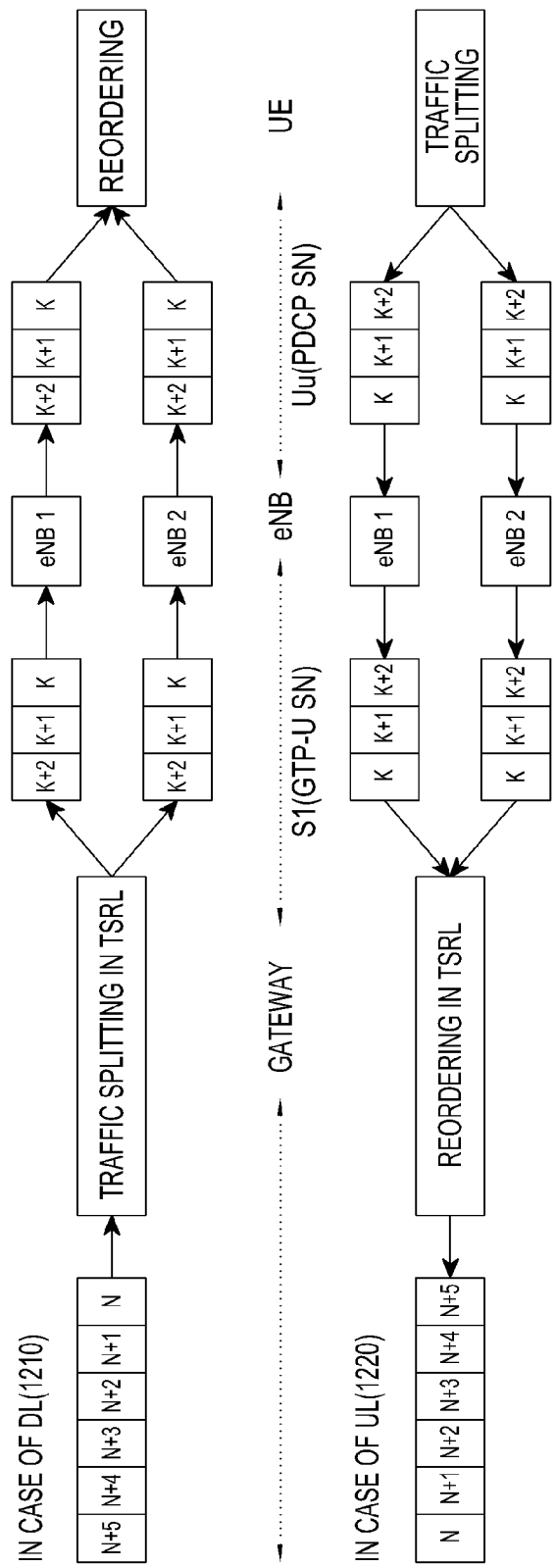
FIG. 12 is an exemplary diagram illustrating another embodiment of a method of splitting and reordering packets in a gateway and a TSRL of a UE according to another aspect of the present disclosure.

FIG. 12 is an exemplary diagram illustrating another embodiment of a method of splitting and reordering packets in a gateway and a TSRL of a UE according to another aspect of the present disclosure. Meanwhile, operations described with reference to FIG. 12 may be performed by a UPF in the case of a 5G network.

Meanwhile, FIG. 12 illustrates SN numbering when a diversity effect is used. In the embodiment illustrated in FIG. 12, since the same packet is doubly transmitted, even if a problem occurs on the network and some of the transmitted packets are lost (e.g., a packet drop), another packet containing the same information may be received so that it is possible to guarantee the safety of data transmission.

In the case of splitting traffic as illustrated in FIG. 11, it is more advantageous in terms of data transmission speed (e.g., a throughput) than the embodiment illustrated in FIG. 12. In the embodiment illustrated in FIG. 12, since the same data is doubly transmitted, it is more advantageous in terms of safety than the embodiment illustrated in FIG. 11.

To perform reordering, it is necessary to adjust SNs of the packets through multiple paths of the same interface. In the above-described Option 2, each RAN node associated with the adjustment for DL traffic needs to be notified of a first SN that a PDCP entity of the RAN node should use for a first packet mapped to the corresponding splitting bearer. For example, in a DL case 1110 of FIG. 11, the eNB1 may set a PDCP SN as Q for an incoming packet K and the eNB2 may set a PDCP SN as Q+2 for an incoming packet K+2. This means that the two eNBs perform the adjusted PDCP SN numbering. Each RAN node associated with the adjustment for UL traffic needs to be notified of a first SN that a GTP-U of the RAN node should use for a first packet mapped to the corresponding splitting bearer. For example, in a UL case 1120 of FIG. 11, the eNB1 may set a GTP SN as K for an incoming packet Q and the eNB2 may set a PDCP SN as K+2 for an incoming packet Q+2. This means that the two eNBs perform the adjusted GTP SN numbering. In order to support the splitting bearer to enable the adjustment of SN numbering, each related RAN may be notified of {PDCP SN INITIAL VALUE, PDCP SN OFFSET}. The PDCP SN INITIAL VALUE may indicate an initial value of a PDCP SN, and the PDCP SN OFFSET may indicate an interval between SNs. Meanwhile, the RAN may apply {PDCP SN INITIAL VALUE+PDCP SN OFFSET} as a PDCP SN for a first received DL packet of the splitting bearer. Similarly, in order to support the splitting bearer, each related RAN may be notified of {GTP SN INITIAL VALUE, GTP SN OFFSET}. The RAN may then apply {GTP SN INITIAL VALUE+GTP SN OFFSET} as a GTP SN for a first received UL packet of the splitting bearer. In DC, this value may be set in the RAN as part of the DC configuration.

Figure 13:
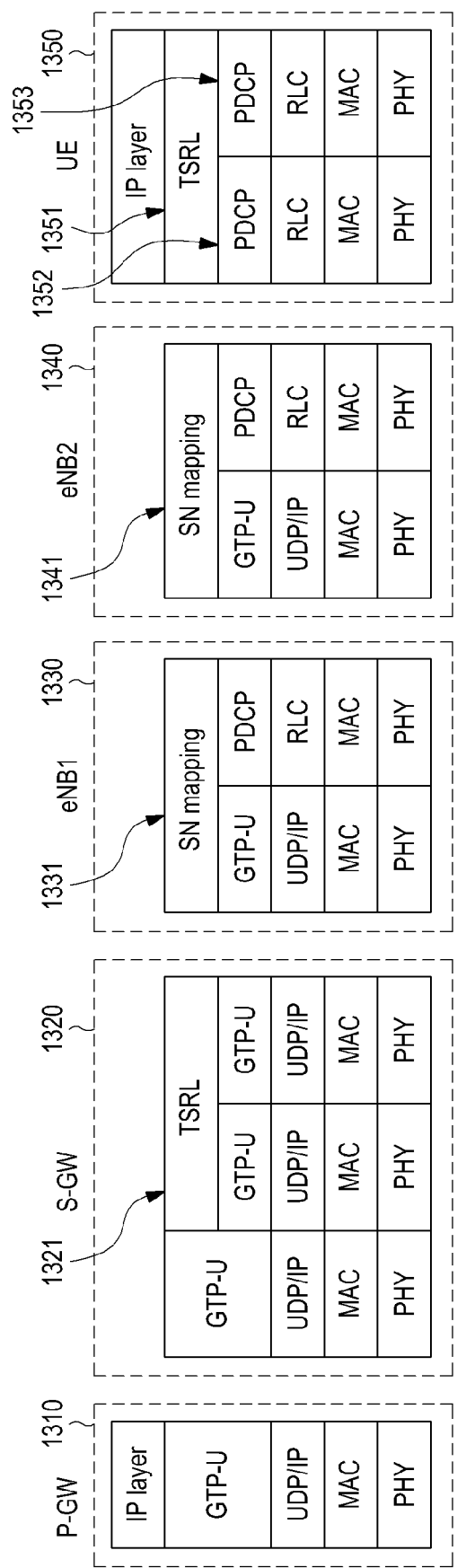
FIG. 13 is an exemplary diagram illustrating another embodiment (Option 2-1) of a communication protocol stack according to another aspect of the present disclosure.

FIG. 13 is an exemplary diagram illustrating another embodiment (Option 2-1) of a communication protocol stack according to another aspect of the present disclosure. For reference, FIG. 13 illustrates a case where a TSRL 1321 is configured in an S-GW 1320. However, the TSRL 1321 may be configured in a different type of gateway or UPF other than the S-GW 1320. In the followings, description made using the S-GW 1320 may be applied to other gateways or UPFs.

According to another embodiment (Option 2-1) of the communication protocol stack according to another aspect of the present disclosure, traffic splitting and reordering are performed based on SN adjustment for multiple paths, and a TSRL on a UE side may be associated with a PDCP entity.

Referring to FIG. 13, unlike the communication protocol stack of FIG. 5, an eNB1 1330 and eNB2 1340 may further include SN mapping layers 1331 and 1341, respectively.

In regard to DL traffic, the TSRL 1321 of the S-GW may perform traffic splitting on incoming traffic so that outgoing traffic may be transmitted via one or a plurality of paths. Here, each path may be a different GTP user plane (GTP-U) tunnel. In case of traffic splitting, the TSRL 1321 may perform SN mapping between a GTP-U packet (e.g., GTP PDU) via an S5 interface between a P-GW 1310 and the S-GW 1320 and a GTP-U packet via an S1 interface between an the eNB1 1330 and the eNB2 1340. The total GTP SN space for GTP-U on the S1 interface over an activated path may be divided into a GTP SN space of a GTP-U for an S1 interface of a first path (path1) and a GTP SN space of GTP-U for an S1 interface of a second path (path2).

The eNBs 1330 and 1340 according to another aspect of the present disclosure may perform SN mapping between GTP-U packets and PDCP packets. To this end, the eNB1 1330 and the eNB2 1340 may include SN mapping layers 1331 and 1341, respectively. An SN gap between adjacent GTP-U packets may be maintained through an SN gap between adjacent PDCP packets. For example, in the DL case, the SN mapping layer 1331 of the eNB1 may check an SN gap of GTP-U packets, received via a GTP-U layer, using a GTP-U header, and may configure the same SN gap as the checked SN gap as the SN gap of the PDCP packets sent down to the PDCP. Here, the SN gap (e.g., PDCP SN OFFSET) may be recorded in a PDCP header space. When a PDCP SDU is transmitted to an upper layer, the PDCP may indicate a COUNT value associated with the PDCP SDU. When the PDCP SDU is transmitted to an upper layer, whether the corresponding gap is due to a loss or the TSRL through the SN gap of the PDCP header space may be determined.

A TSRL 1351 at the UE performs reordering of the PDCP SDUs based on the indicated count value, which may be similar to a method of TS 36.323 section 5.1.2.1.4. On the other hand, the TSRL 1351 at the UE may recognize that received data is split based on the fact that SN gap information is included in the PDCP header space. Meanwhile, the number of PDCPs 1352 and 1353 of the UE may correspond to the number of PDCPs of the eNBs (e.g., eNB1 and eNB2).

In regard to UL traffic, the TSRL 1351 at the UE performs traffic splitting on incoming traffic so that outgoing traffic is transmitted via one or a plurality of paths, where each path may correspond to a different PDCP entity. In case of traffic splitting, the TSRL 1351 of the UE may map an SN between incoming and outgoing packets. The outgoing packet may be a PDCP SDU. The total SN space for the PDCP SDUs over all activated paths may be divided into an SN space for PDCP SDUs of the first path and an SN space for PDCP SDUs for the second path.

The eNBs 1330 and 1340 according to another aspect of the present disclosure may perform SN mapping between GTP-U packets and PDCP packets. At this time, an SN gap between adjacent PDCP packets may be maintained through an SN gap between adjacent GTP-U packets via the S1 interface. A GTP-U layer of the S-GW 1320 may indicate a COUNT value associated with the GTP-U packet when a GTP-U payload is transmitted to an upper layer.

The TSRL 1321 of the S-GW may perform reordering of the GTP-U payload based on the indicated COUNT value. Here, the method of performing reordering may be performed in a similar manner to the reordering function specified in TS 36.323 section 5.1.2.1.4.

Figure 14:
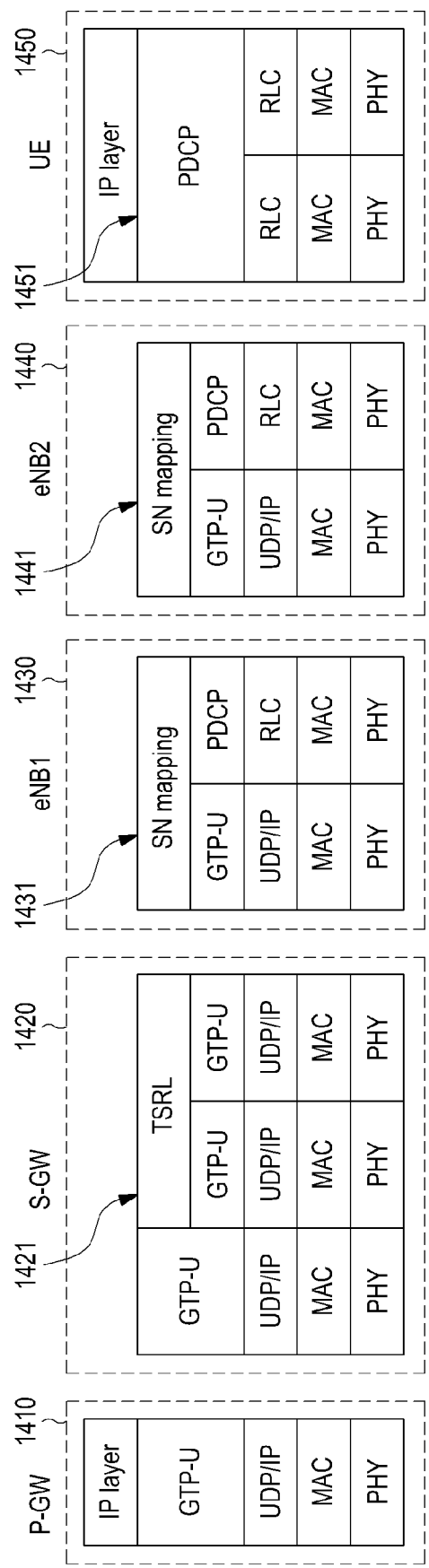
FIG. 14 is an exemplary diagram illustrating another embodiment (Option 2-2) of a communication protocol stack according to another aspect of the present disclosure.

FIG. 14 is an exemplary diagram illustrating another embodiment (Option 2-2) of a communication protocol stack according to another aspect of the present disclosure. For reference, FIG. 14 illustrates a case in which a TSRL 1421 is configured in an S-GW 1420. However, the TSRL 1421 may be configured in a different type of gateway or UPF other than the S-GW 1420. In the following description, obviously, description made using the S-GW 1420 may be applied to other gateways or UPFs.

According to another embodiment (Option 2-2) of the protocol stack according to another aspect of the present disclosure, traffic splitting and reordering are performed based on SN adjustment through multiple paths, and a TSRL on a UE side may be associated with a radio link control (RLC) entity.

In regard to DL traffic, the TSRL 1421 of the S-GW may perform traffic splitting on incoming traffic so that outgoing traffic is transmitted via on one or a plurality of paths. Here, each path may correspond to a different GTP-U tunnel. In case of traffic splitting, the TSRL 1421 may perform SN mapping between a GTP-U packet via an S5 interface between a P-GW 1410 and the S-GW 1420 and a GTP-U packet via an S1 interface. The total GTP SN space for GTP-U on the S1 interface over all activated paths may be divided into a GTP SN space of GTP-U for the S1 interface of a first path (path1) and a GTP SN space of GTP-U for the S1 interface of a second path (path2).

The eNBs 1430 and 1440 according to another aspect of the present disclosure may perform SN mapping between GTP-U packets (e.g., GTP PDUs) and PDCP packets (e.g., PDCP PDUs). An SN gap between adjacent GTP-U packets may be maintained through an SN gap between adjacent PDCP packets.

The PDCP 1451 of the UE may perform reordering of PDCP PDUs as described in TS 36.323 section 5.1.2.1.4. Meanwhile, the PDCP 1451 of the UE illustrated in FIG. 14 is composed of one PDCP 1451, unlike the embodiment illustrated in FIG. 13. That is, in the embodiment illustrated in FIG. 13, the number of PDCPs of the eNBs 1330 and 1340 and the number of PDCPs 1352 and 1353 of the UE correspond one-to-one. However, in the embodiment illustrated in FIG. 14, a ratio of the number of PDCPs existing in the eNBs 1430 and 1440 and the number of PDCPs of the UE may be n:1. In addition, unlike the embodiment illustrated in FIG. 13 in which the TSRL performs reordering, the PDCP 1451 performs reordering in the embodiment illustrated in FIG. 14.

In regard to UL traffic, the PDCP of the UE performs traffic splitting on incoming traffic so that outgoing traffic is transmitted via one or a plurality of paths, where each path may correspond to another RLC entity. For traffic splitting, the PDCP 1451 at the UE may map an SN between the PDCP SDU and the PDCP PDU. The total SN space of the PDCP PDUs over all the activated paths may be divided into an SN space for the PDCP PDU of the first path (path1) and an SN space for the PDCP PDU for the second path (path2). The eNBs 1430 and 1440 according to another aspect of the present disclosure may perform SN mapping between GTP-U packets and PDCP packets. At this time, an SN gap between adjacent PDCP packets may be maintained through an SN gap between adjacent GTP-U packets via the S1 interface. A GTP-U layer of the S-GW 1420 may indicate a COUNT value associated with the GTP-U packet when a GTP-U payload is transmitted to an upper layer.

The TSRL 1421 of the S-GW may perform reordering of the GTP-U payload based on the indicated COUNT value. Here, the method of performing reordering may be performed in a similar manner to the reordering function specified in TS 36.323 section 5.1.2.1.4.

A traffic splitting entity according to another aspect of the present disclosure may request assistance information required to perform traffic splitting. The assistance information may be defined as a set of assistance information elements. Each assistance information element may represent the performance measured in the corresponding transmission path. As the assistance information element, for example, at least one of transmission delay, queue size, throughput, and the like may be considered.

The transmission delay as the assistance information element may be queuing delay in a transmission buffer. Specifically, when traffic splitting on UL traffic is performed in an upper layer than the PDCP, the queuing delay may be measured in a PDCP transmission buffer, and when traffic splitting on UL traffic is performed in an upper layer than the RLC, the queuing delay may be measured in an RLC transmission buffer.

Figure 15:
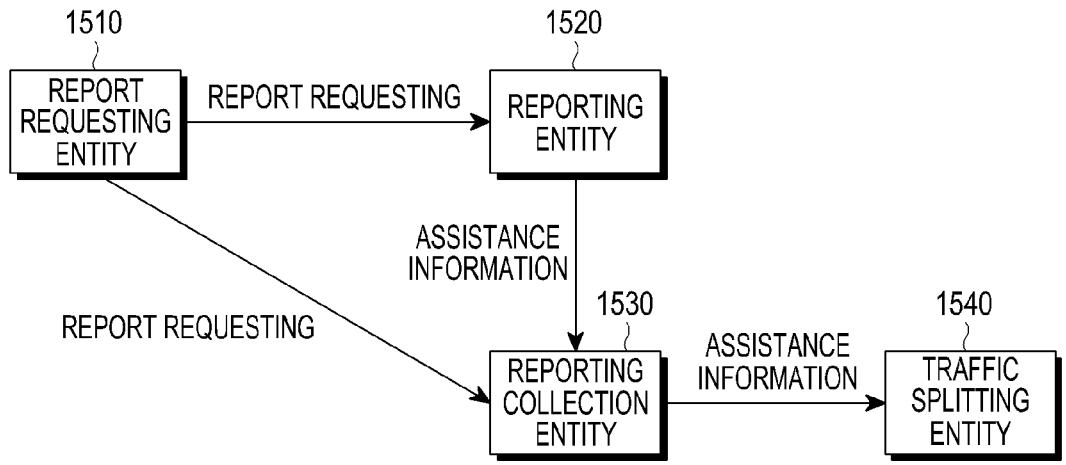
FIG. 15 is an exemplary diagram illustrating one embodiment of a system for supporting a DC structure according to another aspect of the present disclosure.

FIG. 15 is an exemplary diagram illustrating one embodiment of a system for supporting a DC structure according to another aspect of the present disclosure.

As illustrated in FIG. 15, a system for supporting the DC structure may include a report requesting entity 1510, a reporting entity 1520, a reporting collection entity 1530, and a traffic splitting entity 1540. Since each of the components 1510 to 1540 represents only one concept, a plurality of components can be implemented in one device. For example, the report requesting entity 1510, the reporting collection entity 1530, and the traffic splitting entity 1540 may be implemented in one device, that is, a gateway or a UPF. However, this is merely an example, and the technology according to another aspect of the present disclosure is not limited thereto. The report requesting entity 1510 may set the reporting entity 1520 to report assistance information to the reporting collection entity 1530. Next, the reporting entity 1520 reports the assistance information to the reporting collection entity 1530. The reporting collection entity 1530 provides the assistance information to the traffic splitting entity 1540. The traffic splitting entity 1540 performs traffic splitting based on the received assistance information. Accordingly, one core network entity of the wireless network system according to another aspect of the present disclosure may support data transmission with respect to a plurality of network entities (e.g., a plurality of eNBs). Meanwhile, the DC structure illustrated in FIG. 15 may be implemented in the forms illustrated in FIGS. 16, 18, 20, 22, 24, 26, 28, 30, and 32. This will be descripted in detail below.

First to ninth embodiments in which technologies associated with traffic splitting, assistance information configuration (assistance information reporting request), and assistance information reporting according to another aspect of the present disclosure are applied to a 4G or 5G network system will be herein described with reference to FIGS. 16 to 33.

The contents according to a first embodiment (traffic splitting at UPF, report configuration via AMF and direct reporting) are as follows.

Figure 16:
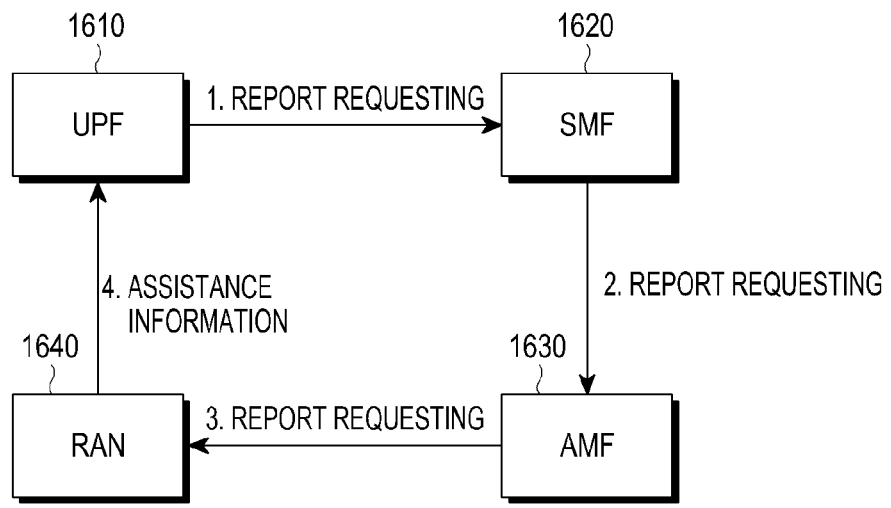
FIG. 16 is an exemplary embodiment illustrating a first embodiment associated with report requesting via SMF and AMF, traffic splitting at UPF, and assistance information direct reporting of a RAN node according to another aspect of the present disclosure.

FIG. 16 is an exemplary embodiment illustrating a first embodiment associated with report requesting via SMF and AMF, traffic splitting at UPF, and assistance information direct reporting of RAN node according to another aspect of the present disclosure.

A UPF 1610 may initiate an assistance report configuration (request) and may receive an assistance information report from a RAN 1640. The following should be noted: 1) A report configuration message or a report requesting message may be transmitted to a control plane including the UPF 1610, an SMF 1620, an AMF 1630, and the RAN 1640 via an interface associated with the UPF 1610, the SMF 1620, the AMF 1630, and the RAN 1640. 2) A control PDU may be introduced between the UPF 1610 and the RAN 1640 to transmit assistance information from the RAN 1640 to the UPF 1610. One method of defining the control PDU between the RAN 1640 and the UPF 1610 is to introduce a PDU type in a TSRL header introduced for this disclosure. The RAN 1640 then configures a TSRL control PDU that transmits the assistance information. Alternatively, the control PDU between the RAN 1640 and the UPF 1610 may be defined to use a field of a GTP header in order to indicate that the GTP header is the control PDU between the RAN 1640 and the UPF 1610. Alternatively, a control plane may be established between the RAN 1640 and the UPF 1610 so that packets on the user plane and packets on the control plane are completely separated from the RAN 1640 and the UPF 1610. The control plane may be established when a user plane tunnel is established between the RAN 1640 and the UPF 1610 for the related UE or when DC is configured for the related UE. 3) To start assistance information reporting procedures, the UPF 1610 may transmit a message including report configuration (or report requesting) to the SMF 1620. Upon receiving the message from the UPF 1610, the SMF 1620 may transmit the message including report configuration (or report requesting) to the AMF 1630. Upon receiving the message from the SMF 1620, the AMF 1630 may transmit the message including report configuration (or report requesting) to one or more RAN nodes 1640 for which assistance information report is requested. Upon receiving the message including report configuration (or report requesting) from the AMF 1630, the RAN node 1640 may start the assistance information report according to the received report configuration (or report requesting). When a report condition is satisfied, the RAN node 1640 may transmit the assistance information directly to the UPF 1610.

Figure 17:
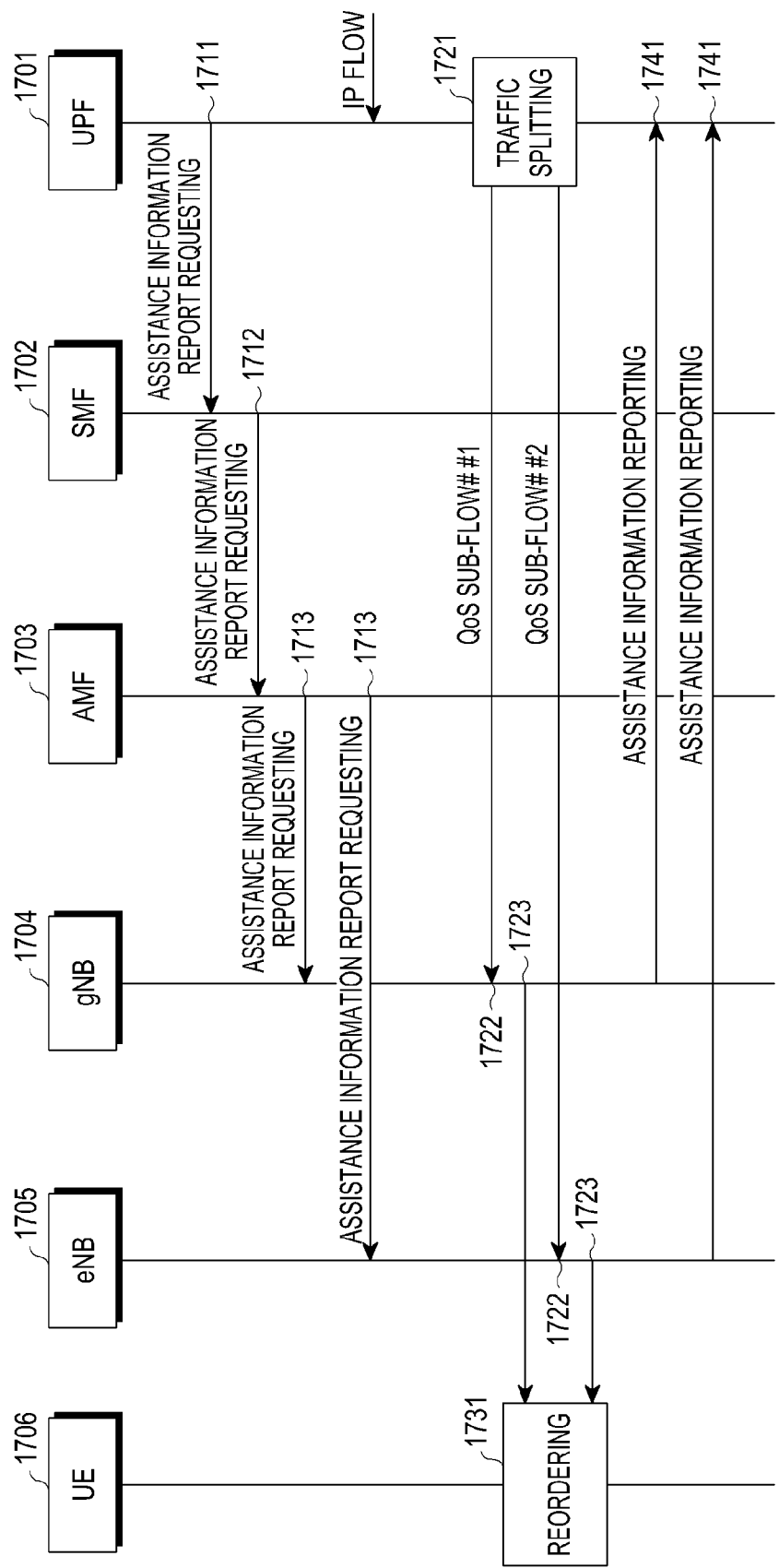
FIG. 17 is a flowchart illustrating the first embodiment associated with report requesting via SMF and AMF, traffic splitting at UPF, and assistance information direct reporting of a RAN node according to another aspect of the present disclosure.

FIG. 17 is a flowchart illustrating the first embodiment associated with report requesting via SMF and AMF, traffic splitting at UPF, and assistance information direct reporting of RAN node according to another aspect of the present disclosure.

In operation 1711, a UPF 1701 transmits an assistance information report request to an SMF 1702. A report request message includes traffic flow identification information that can identify traffic for which the assistance information report is requested. The identification information transmitted to the SMF 1702 may be composed of {UE identifiers, a traffic flow identifier}. The UE identifier is used to identify the UE 1706 in the SMF 1702. The traffic flow identifier is used to identify the traffic flow in a set of traffic flows identified by the UE identifier in the SMF 1702.

In operation 1712, upon receiving the assistance information report request from the UPF 1701, the SMF 1702 confirms the identified UE and an AMF 1703 supporting the traffic flow. Next, the SMF 1702 transmits the assistance information report request to the AMF. A report request message includes traffic flow identification information on the traffic flow for which the assistance information report is requested. The identification information transmitted to the AMF 1703 may be composed of {a UE identifier, a traffic flow}. The UE identifier is used to identify the UE 1706 in the AMF 1703. The traffic flow identifier is used to identify the traffic flow in a set of traffic flows identified by the UE identifier in the AMF 1703.

Upon receiving the assistance information report request from the SMF 1702, the AMF 1703 confirms the identified UE and a RAN node supporting the traffic flow. One or more RAN nodes may support the related traffic flow. Next, the AMF 1703 transmits the assistance information report request to each RAN node. In the first embodiment, the AMF 1703 transmits the assistance information report request to a gNB 1704 and an eNB 1705, respectively. The gNB 1704 may be a base station supporting a 5G network. Meanwhile, the identification information transmitted to the RAN node may be composed of {a UE identifier, a traffic flow}. The UE identifier is used to identify the UE 1706 at the RAN node. The traffic flow identifier is used to identify the traffic flow in a set of traffic flows identified by the UE identifier at the RAN node. When a plurality of RAN nodes service the related traffic flows and each RAN node uses different types of information to identify the UE and/or traffic flow, the AMF 1703 configures a separate report request message for each RAN so that each RAN can correctly identify the corresponding UE/traffic flow.

In operation 1713, upon receiving the assistance information report request from the AMF 1703, the RAN node starts the reporting procedures. Each RAN node triggers a report, initiates measurement of metric contained in the report message, or collects statistics. The above procedures may be performed as part of a DC configuration that includes a splitting bearer configuration. The UE 1706 is composed of the provided splitting bearer and DC. On the other hand, a report response may be introduced for each report request. For example, after receiving the report request message from the AMF 1703, the RAN node may transmit a report response message to the AMF 1703. Next, the AMF 1703 may transmit the report response message to the SMF 1702 and finally, the SMF 1702 may transmit the report response message to the UPF 1701 in operation 1731.

The UPF 1701 starts traffic splitting on incoming DL traffic. An incoming IP traffic is split into one or more quality of service (QoS) sub-flows and each QoS sub-flow is transmitted to the corresponding RAT. In FIG. 17, a QoS sub-flow #1 is transmitted to the gNB 1704 and a QoS sub-flow #2 is transmitted to the eNB 1705 in operation 1722.

The UE 1706 receives data from one or more RANs. In FIG. 17, the UE simultaneously receives data from the eNB and the gNB in operation 1723. Next, when traffic reordering is set, the UE 1706 performs traffic reordering in operation 1731.

Each RAN node evaluates a report triggering condition according to the received report configuration (or report requesting). When the report triggering condition is satisfied, the RAN node configures a report message according to the received report configuration (or report requesting) and provides the report message to the UPF 1701 that processes the corresponding traffic flow in operation 1741.

The contents according to a second embodiment (traffic splitting at UPF, direct report configuration and direct reporting) are as follows.

Figure 18:
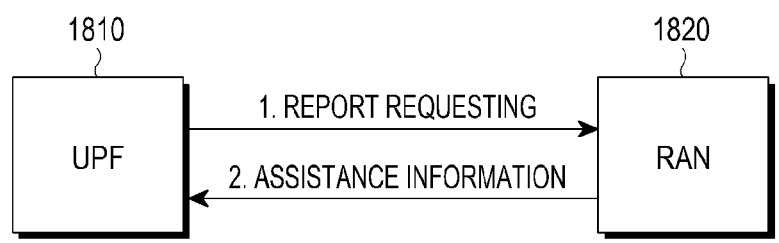
FIG. 18 is an exemplary embodiment illustrating a second embodiment associated with report requesting to a RAN node, traffic splitting at UPF, and assistance information direct reporting of a RAN node according to another aspect of the present disclosure.

FIG. 18 is an exemplary embodiment illustrating a second embodiment associated with report requesting to RAN node, traffic splitting at UPF, and assistance information direct report of a RAN node according to another aspect of the present disclosure.

A UPF 1810 directly starts assistance report configuration (or report requesting) to a RAN node 1820 (e.g., eNB 1705 or gNB 1704) and receives a direct assistance information report from the RAN node. A control PDU may be introduced between the UPF 1810 and the RAN node 1820 for assistance information configuration and transmission from the RAN node 1820 to the UPF 1810. The method of defining the control PDU between the UPF 1610 and the RAN node 1640 provided in the above-described first embodiment may be used in the second embodiment. The UPF 1810 transmits a message containing report configuration (or report requesting) to the RAN node 1820 to start assistance information reporting procedures. Upon receiving the message from the UPF 1810, the RAN node 1820 starts assistance information report according to the report configuration (or report requesting). When a report condition is satisfied, the RAN node 1820 directly transmits the assistance information to the UPF 1810.

Figure 19:
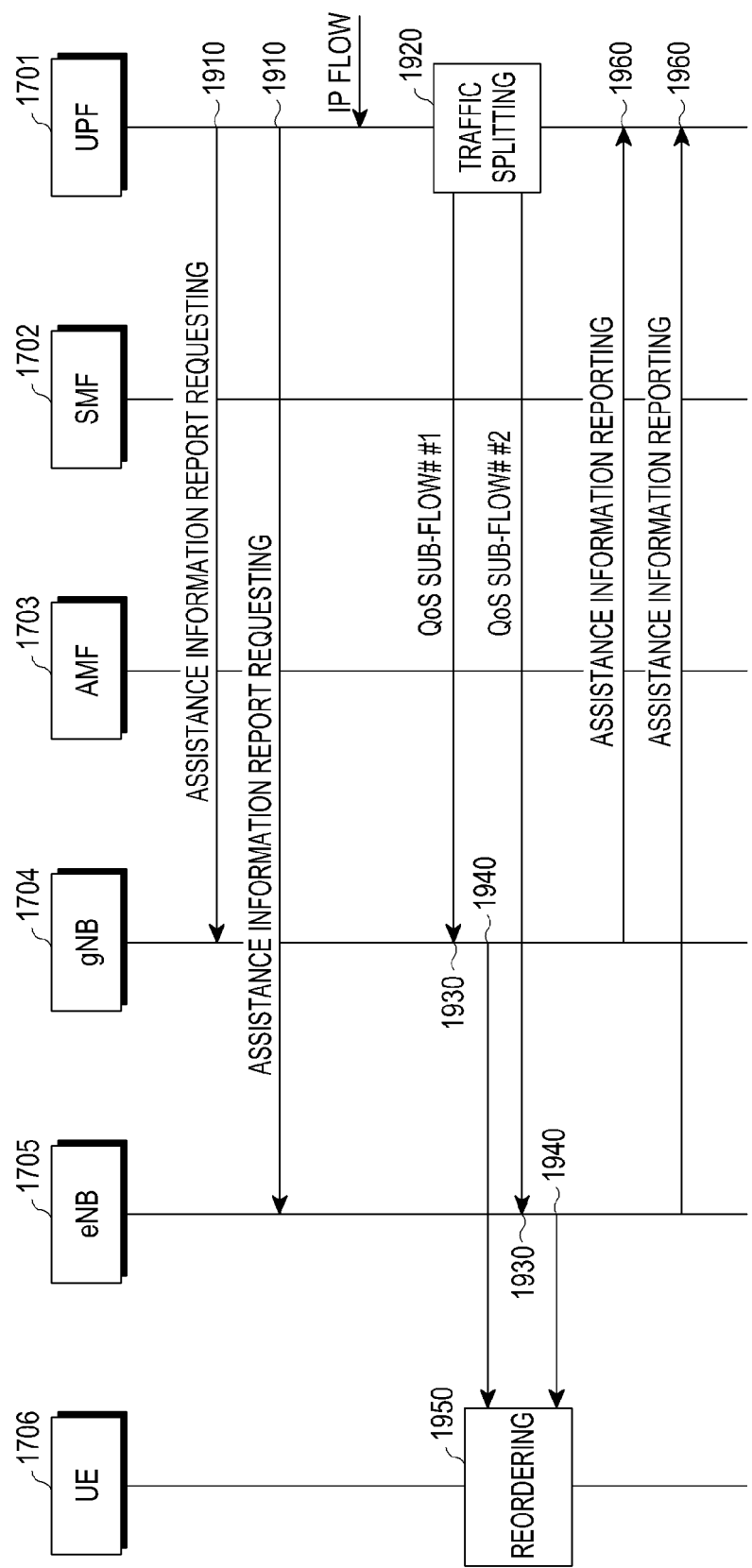
FIG. 19 is a flowchart illustrating the second embodiment associated with report requesting to RAN node, traffic splitting at UPF, and assistance information direct reporting of a RAN node according to another aspect of the present disclosure.

FIG. 19 is a flowchart illustrating the second embodiment associated with report requesting to a RAN node, traffic splitting at UPF, and assistance information direct report of RAN node according to another aspect of the present disclosure.

A UPF 1701 transmits an assistance information report request to a RAN node in operation 1910. A report request message includes traffic flow identification information that can identify traffic for which the assistance information report is requested. The identification information transmitted to the RAN node may be composed of {UE identifiers, a traffic flow identifier}. The UE identifier is used to identify the UE 1706 in the SMF 1702. The traffic flow identifier is used to identify the traffic flow in a set of traffic flows identified by the UE identifier in the SMF 1702.

Upon receiving the assistance information report request from the UPF 1701, the RAN node starts reporting procedures. Each RAN node triggers a report, starts measurement of metric included in the report message, or collects statistics.

The above procedures may be performed as part of a DC configuration that includes a splitting bearer configuration. The UE 1706 is composed of the provided splitting bearer and DC.

Although not illustrated for simplicity, a report response for each report request may be introduced. For example, after receiving the report request, the RAN node may make a report respond to the UPF.

The UPF 1701 starts to perform traffic splitting on incoming DL traffic in operation 1920. An incoming IP traffic is split into one or more QoS sub-flows and each QoS sub-flow is transmitted to the corresponding RAT. In FIG. 19, a QoS sub-flow #1 is transmitted to a gNB and a QoS sub-flow #2 is transmitted to an eNB in operation 1930.

The UE 1706 receives data from one or more RATs in operation 1940. In FIG. 19, the UE simultaneously receives data from the eNB 1705 and the gNB 1704 in operation 1940. Next, when traffic reordering is set, the UE 1706 performs traffic reordering in operation 1950.

Each RAN node evaluates a report triggering condition according to the received report configuration (or report requesting). When the report triggering condition is satisfied, the RAN node configures a report message according to the received report configuration (or report requesting) and provides the report message to the UPF processing the corresponding traffic flow in operation 1960.

The contents according to a third embodiment (traffic splitting at UPF, report configuration via AMF and direct reporting via AMF) are as follows.

Figure 20:
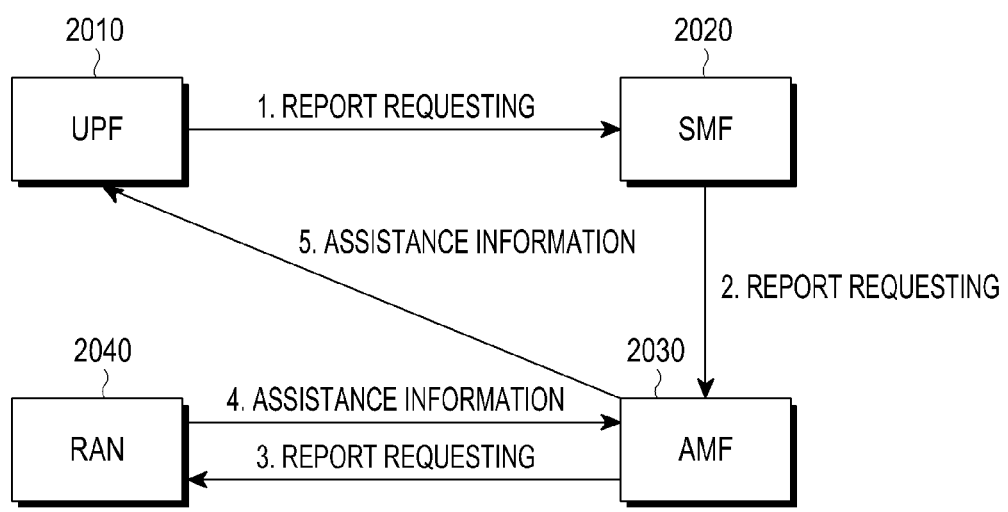
FIG. 20 is an exemplary embodiment illustrating a third embodiment associated with report requesting via SMF and AMF, traffic splitting at UPF, and assistance information reporting via AMF according to another aspect of the present disclosure.

FIG. 20 is an exemplary embodiment illustrating a third embodiment associated with report requesting via SMF and AMF, traffic splitting at UPF, and assistance information reporting via AMF according to another aspect of the present disclosure.

The third embodiment is the same as the first embodiment except for the following matters. 1) When a report condition is satisfied, the RAN nodes 1704 and 1705 transmit assistance information to an AMF 2030. 2) The AMF 2030 receives and collects the assistance information from the RAN nodes 1704 and 1705. 3) The AMF 2030 transmits an assistance information report to a UPF 2010 through a control plane between the AMF 2030 and the UPF 2010.

The AMF 2030 may receive the assistance information from different RANs at different timings. To reduce a control signal for the UPF 2010, the AMF 2030 may collect the assistance information and may transmit the assistance information report in which the assistance information received through one or more RAN nodes is collected.

Figure 21:
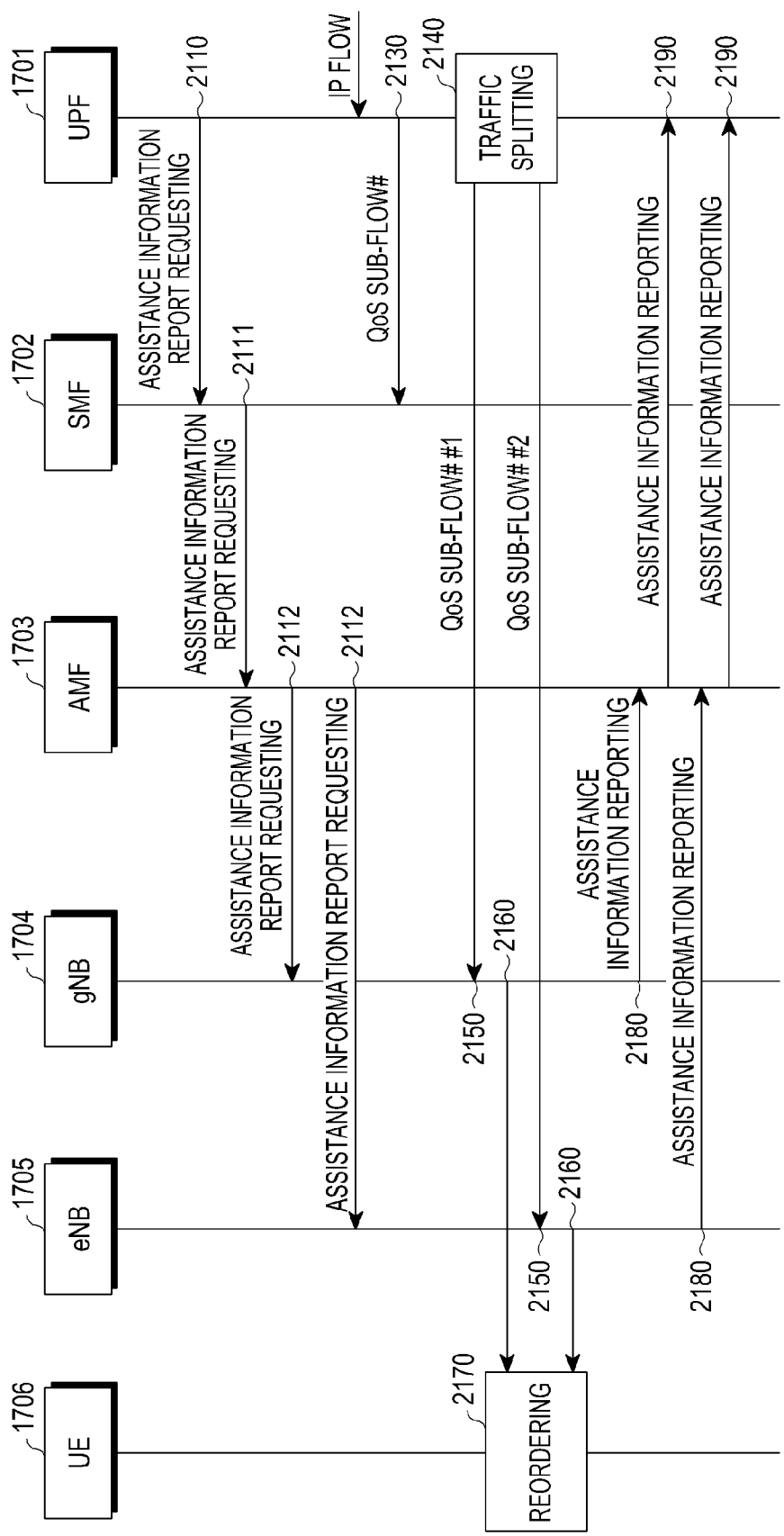
FIG. 21 is a flowchart illustrating the third embodiment associated with report requesting via SMF and AMF, traffic splitting at UPF, and assistance information reporting via AMF according to another aspect of the present disclosure.

FIG. 21 is a flowchart illustrating the third embodiment associated with report requesting via SMF and AMF, traffic splitting at UPF, and assistance information reporting via AMF according to another aspect of the present disclosure.

The following operations may be added in the above-described operations of FIG. 17 (first embodiment) such as assistance information report requesting (operations 1711 to 1713), traffic splitting (operation 1721), split traffic transmission (operations 1722 and 1723), reordering (operation 1731), and assistance information reporting (operation 1741).

Each RAN node (e.g., eNB 1705 or gNB 1704) evaluates a report triggering condition according to the received report configuration (or report requesting). When the report triggering condition is satisfied, the RAN nodes 1704 and 1705 generate a report message according to the report configuration (or report requesting) and transmit the generated report message to the AMF 1703 in operation 2180.

Upon receiving the report message from the RAN nodes 1704 and 1705, the AMF 1703 configures an assistance information report message including the total assistance information received from the gNB 1704 and the eNB 1705 in operation 2190.

Meanwhile, operations 2110 to 2112, 2140, 2150, 2160, and 2170 of FIG. 21 may be the same as operations 1711 to 1713, 1721, 1722, 1723, and 1731 of FIG. 17.

The contents according to a fourth embodiment (traffic splitting at UPF, report configuration directly and reporting via AMF) are as follows.

Figure 22:
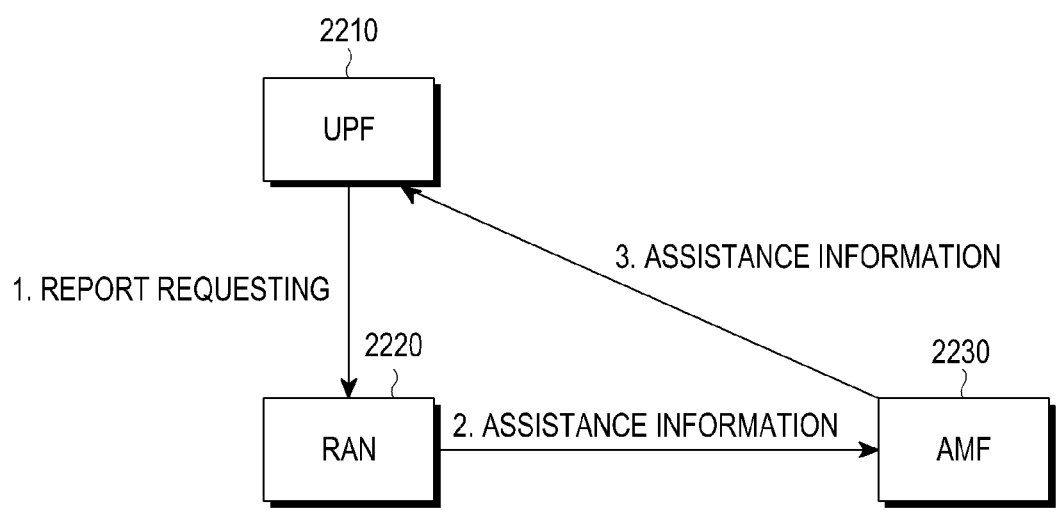
FIG. 22 is an exemplary embodiment illustrating a fourth embodiment associated with report requesting to a RAN node, traffic splitting at UPF, and assistance information reporting via AMF according to another aspect of the present disclosure.

FIG. 22 is an exemplary embodiment illustrating a fourth embodiment associated with report requesting to RAN node, traffic splitting at UPF, and assistance information reporting via AMF according to another aspect of the present disclosure.

Unlike the above-described third embodiment as illustrated in FIGS. 20 and 21 in which the assistance information report request is performed through an SMF 2020 and the AMF 2030, in the fourth embodiment, a UPF 2210 directly transmits the assistance information report request to a RAN node 2220. Therefore, the SMF and an AMF 2230 are not involved in the assistance information report request. In addition, a control PDU may be introduced between the UPF 2210 and the RAN node 2220 to transmit the assistance information report request from the UPF 2210 to the RAN 2220. A method of defining the control PDU between the RAN node 1640 and the UPF 1610 provided in the first embodiment described above with reference to FIGS. 16 and 17 can be used.

Figure 23:
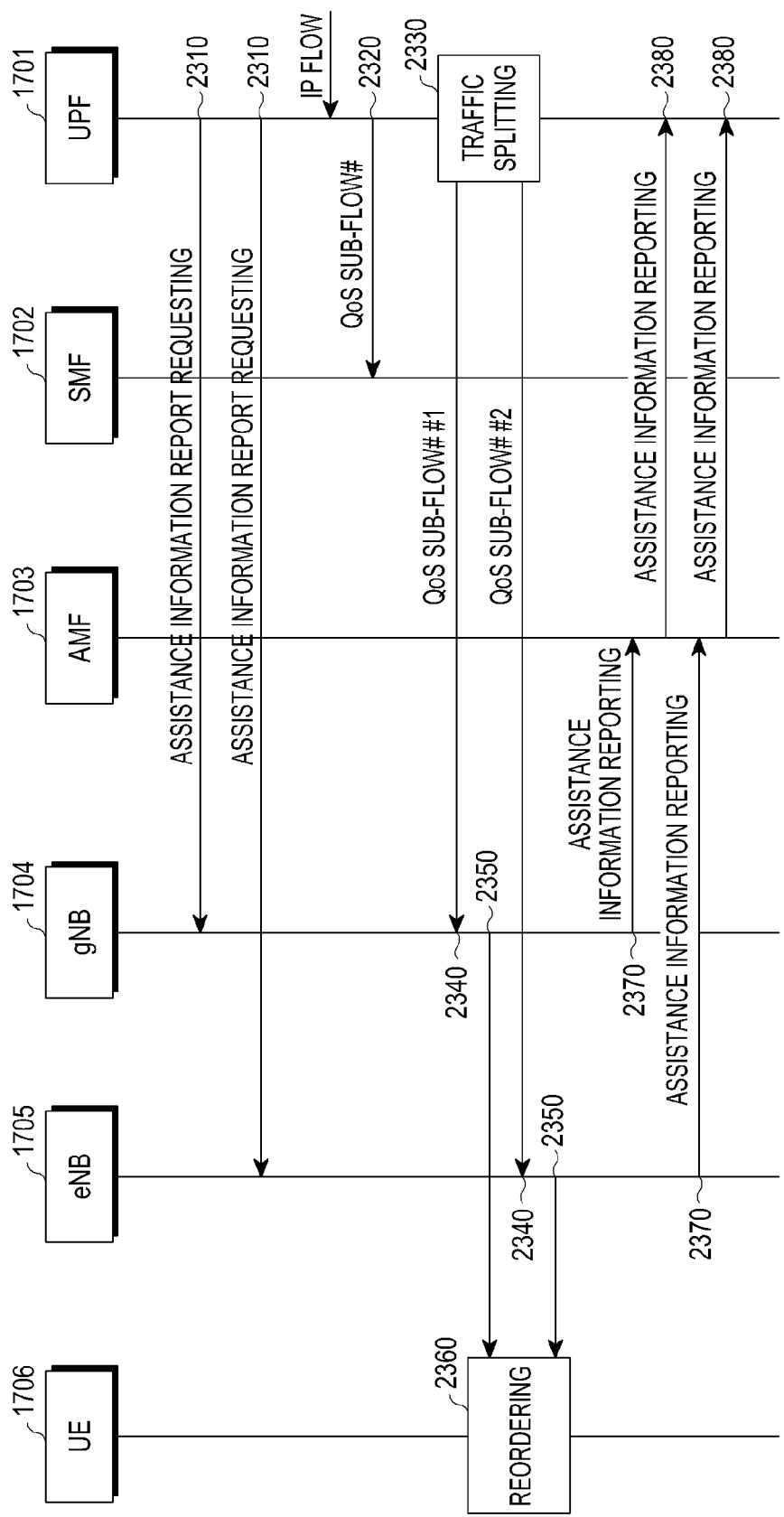
FIG. 23 is a flowchart illustrating the fourth embodiment associated with report requesting to a RAN node, traffic splitting at UPF, and assistance information reporting via AMF according to another aspect of the present disclosure.

FIG. 23 is a flowchart illustrating a fourth embodiment associated with report requesting to RAN node, traffic splitting at UPF, and assistance information reporting via AMF according to another aspect of the present disclosure.

Unlike the UPF 1701 according to the above-described third embodiment (FIG. 21) transmits the assistance information report request through the SMF 1702 and the AMF 1703, the UPF 1701 according to the fourth embodiment directly transmits the assistance information report request to the RAN nodes 1704 and 1705 in operation 2310. Accordingly, operation 1712 in which the SMF 1702 of the third embodiment transmits the assistance information report request to the AMF 1703 and operation 1713 in which the AMF 1703 transmits the assistance information report request to the RAN nodes 1704 and 1705 are not performed. Operations 2320 to 2380 of FIG. 23 may be the same as operations 2130 to 2190 of FIG. 21.

The contents according to a fifth embodiment (traffic splitting at UPF, report configuration via SMF & AMF and reporting via SMF) are as follows.

Figure 24:
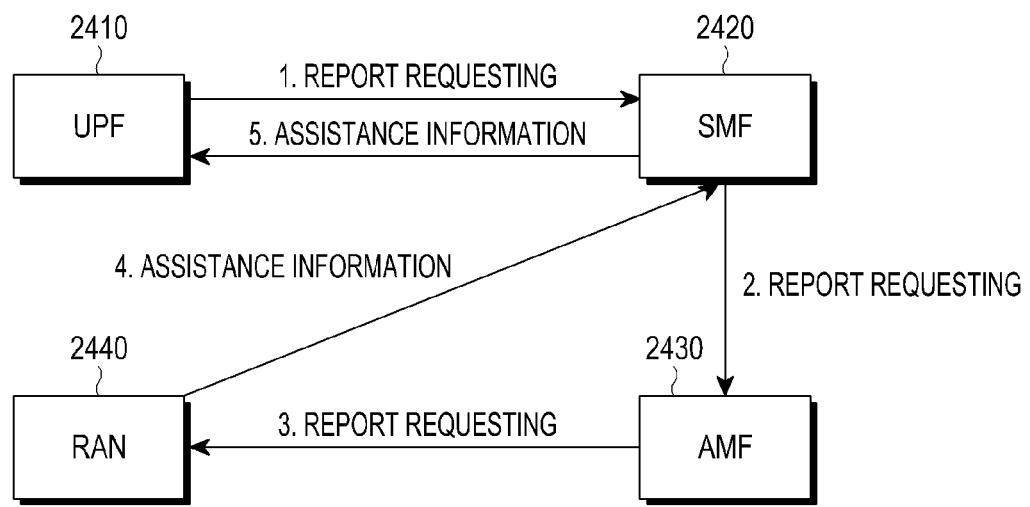
FIG. 24 is an exemplary embodiment illustrating a fifth embodiment associated with report requesting via SMF and AMF, traffic splitting at UPF, and assistance information reporting via SMF according to another aspect of the present disclosure.

FIG. 24 is an exemplary embodiment illustrating the fifth embodiment associated with report requesting via SMF and AMF, traffic splitting at UPF, and assistance information reporting via SMF according to another aspect of the present disclosure.

The fifth embodiment is the same as the third embodiment as illustrated in FIGS. 20 and 21 except for the followings: 1) A RAN node 2440 transmits assistance information to an SMF 2420 when a report condition is satisfied. 2) The SMF 2420 receives and collects the assistance information from the RAN node 2440. 3) The SMF 2420 transmits an assistance information report to the UPF 2410 via a control plane between the SMF 2420 and the UPF 2410.

The SMF 2420 may receive the assistance information from different RANs at different timings. To reduce a control signal for the UPF 2410, the SMF 2420 may collect the assistance information and may transmit the assistance information report in which the assistance information received through one or more RAN nodes is collected.

Figure 25:
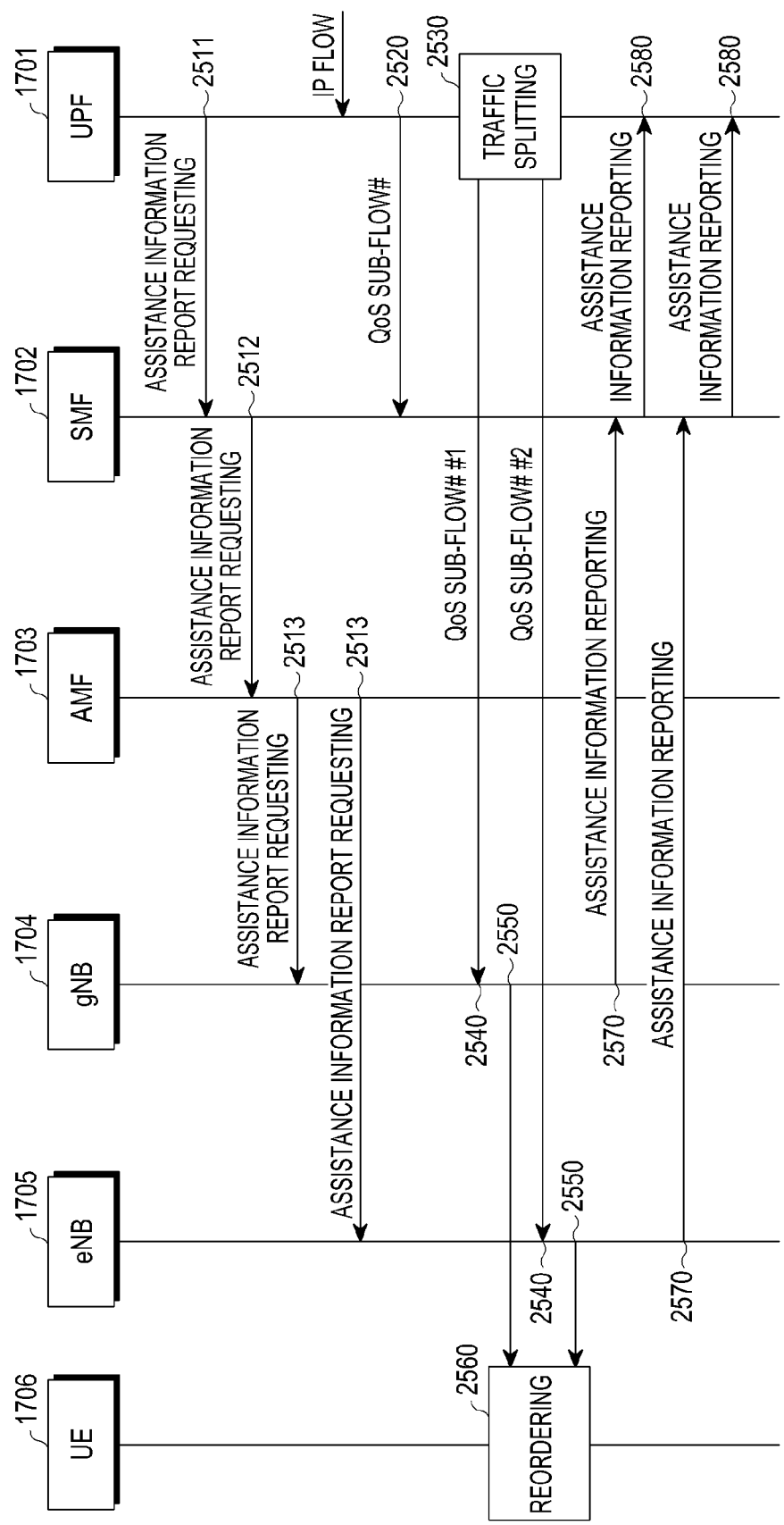
FIG. 25 is a flowchart illustrating the fifth embodiment associated with report requesting via SMF and AMF, traffic splitting at UPF, and assistance information reporting via SMF according to another aspect of the present disclosure.

FIG. 25 is a flowchart illustrating a fifth embodiment associated with report requesting via SMF and AMF, traffic splitting at UPF, and assistance information reporting via SMF according to another aspect of the present disclosure.

Unlike each RAN node 1704 or 1705 reports the assistance information directly to the UPF 1701 in the above-described first embodiment illustrated in FIG. 17, the fifth embodiment may include operation 2570 in which each RAN node 1704 or 1705 evaluates a report triggering condition according to the received report configuration (or report requesting), and generates a report message according to the report requesting when the report condition is satisfied and transmits the generated report message to the SMF. In addition, upon receiving the report message from the RAN nodes 1704 and 1705 according to the fifth embodiment, there is a difference with the first embodiment in that the SMF 1702 configures an assistance information report message including the total assistance information received from the gNB 1704 and the eNB 1705 in operation 2580. Meanwhile, operations 2511 to 2513, 2530, 2540, 2550, and 2560 in FIG. 25 may be the same as operations 1711 to 1713, 1721, 1722, 1723, and 1731 of FIG. 17.

The contents according to a sixth embodiment (traffic splitting at UPF, report configuration directly, and reporting via SMF) are as follows.

Figure 26:
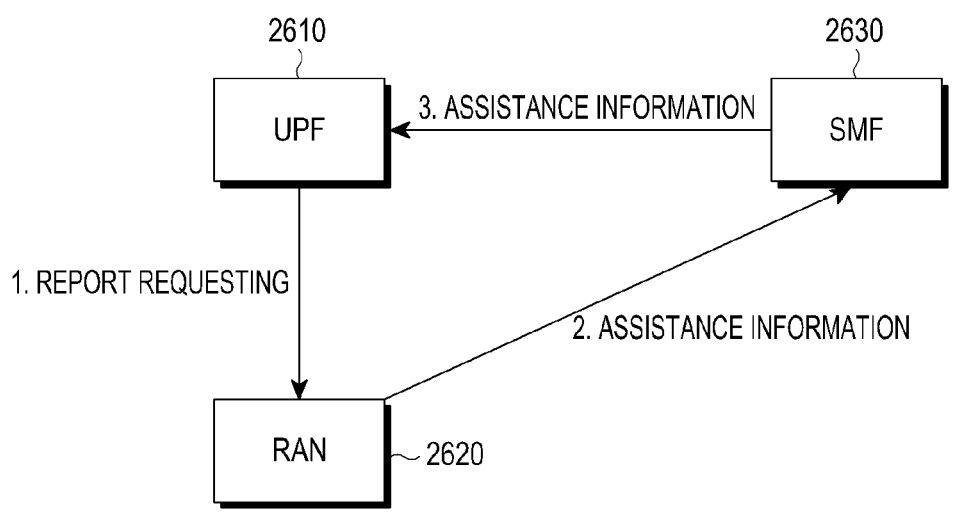
FIG. 26 is an exemplary embodiment illustrating a sixth embodiment associated with report requesting to a RAN node, traffic splitting at UPF, and assistance information reporting via SMF according to another aspect of the present disclosure.

FIG. 26 is an exemplary embodiment illustrating a sixth embodiment associated with report requesting to a RAN node, traffic splitting at UPF, and assistance information reporting via SMF according to another aspect of the present disclosure.

The sixth embodiment is the same as the fifth embodiment as illustrated in FIGS. 24 and 25 except for the following: 1) A UPF 2610 directly transmits an assistance information report configuration (or report requesting) to a RAN node 2620. An SMF 2630 and an AMF are not involved in the report configuration (or report requesting). 2) A control PDU may be introduced between the UPF 2610 and the RAN node 2620 to transmit the assistance information report configuration (or report requesting) between the UPF 2610 and the RAN 2620. A method of defining the control PDU between the UPF 1810 and the RAN node 1820 provided in the first embodiment as illustrated in FIGS. 16 and 17 may be used.

Figure 27:
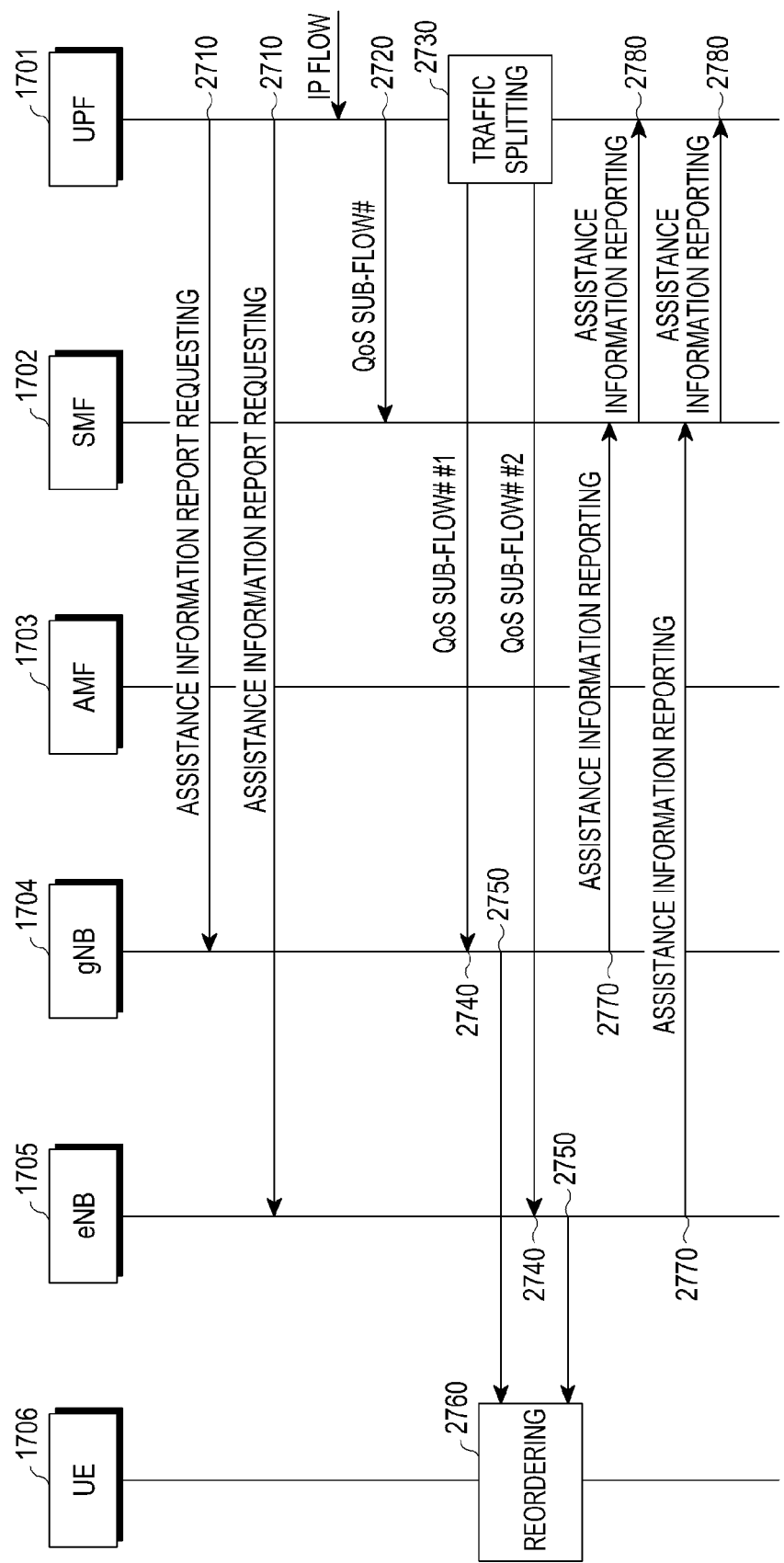
FIG. 27 is a flowchart illustrating the sixth embodiment associated with report requesting to a RAN node, traffic splitting at UPF, and assistance information reporting via SMF according to another aspect of the present disclosure.

FIG. 27 is a flowchart illustrating the sixth embodiment associated with report requesting to a RAN node, traffic splitting at UPF, and assistance information reporting via SMF according to another aspect of the present disclosure.

Meanwhile, operations 2720 to 2780 in FIG. 27 (the sixth embodiment) may be performed in the same manner as operations 2520 to 2580 in FIG. 25 (the fifth embodiment). However, in the embodiment illustrated in FIG. 25 (the fifth embodiment), the assistance information report request is made through the SMF 1702 and the AMF 1703 (operations 2511 to 2513 in FIG. 25), but in the embodiment illustrated in FIG. 27 (the sixth embodiment), the UPF directly transmits the assistance information report request to the RAN node 2710 in FIG. 27.

The contents according to a seventh embodiment (traffic splitting at S-GW, direct report configuration and direct reporting) are as follows.

Figure 28:
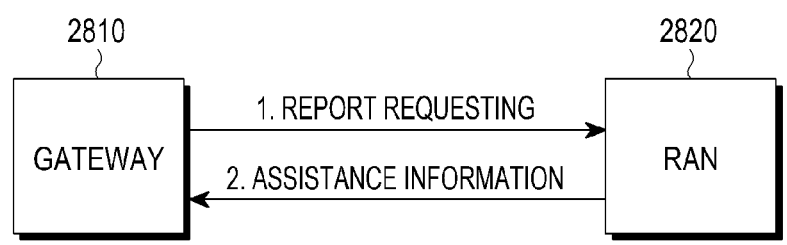
FIG. 28 is an exemplary embodiment illustrating a seventh embodiment associated with report requesting to a RAN node, traffic splitting at gateway, and assistance information direct reporting of a RAN node according to another aspect of the present disclosure.

FIG. 28 is an exemplary embodiment illustrating a seventh embodiment associated with report requesting to RAN node, traffic splitting at gateway, and assistance information direct reporting of RAN node according to another aspect of the present disclosure.

A gateway 2810 starts an assistance report configuration (or report requesting) directly to a RAN node 2820 and receives an assistance report directly from RAN node 2820. A control PDU may be introduced between the gateway 2810 and the RAN node 2820 for the purpose of assistance information configuration and transmission from the RAN node 2820 to the gateway 2810. A method of defining the control PDU between the RAN node 1640 and the UPF 1610 provided in the above-described first embodiment as illustrated in FIGS. 16 and 17 can be used.

To start assistance information reporting procedures, the gateway 2810 transmits a message transmitting the report configuration (or report requesting) to the related RAN node 2820. Upon receiving the report configuration (or report requesting) from the gateway 2810, the RAN node 2820 starts the assistance information report according to the received report configuration (or report requesting). When a report condition is satisfied, the RAN node 2820 transmits the assistance information directly to the gateway 2810.

Figure 29:
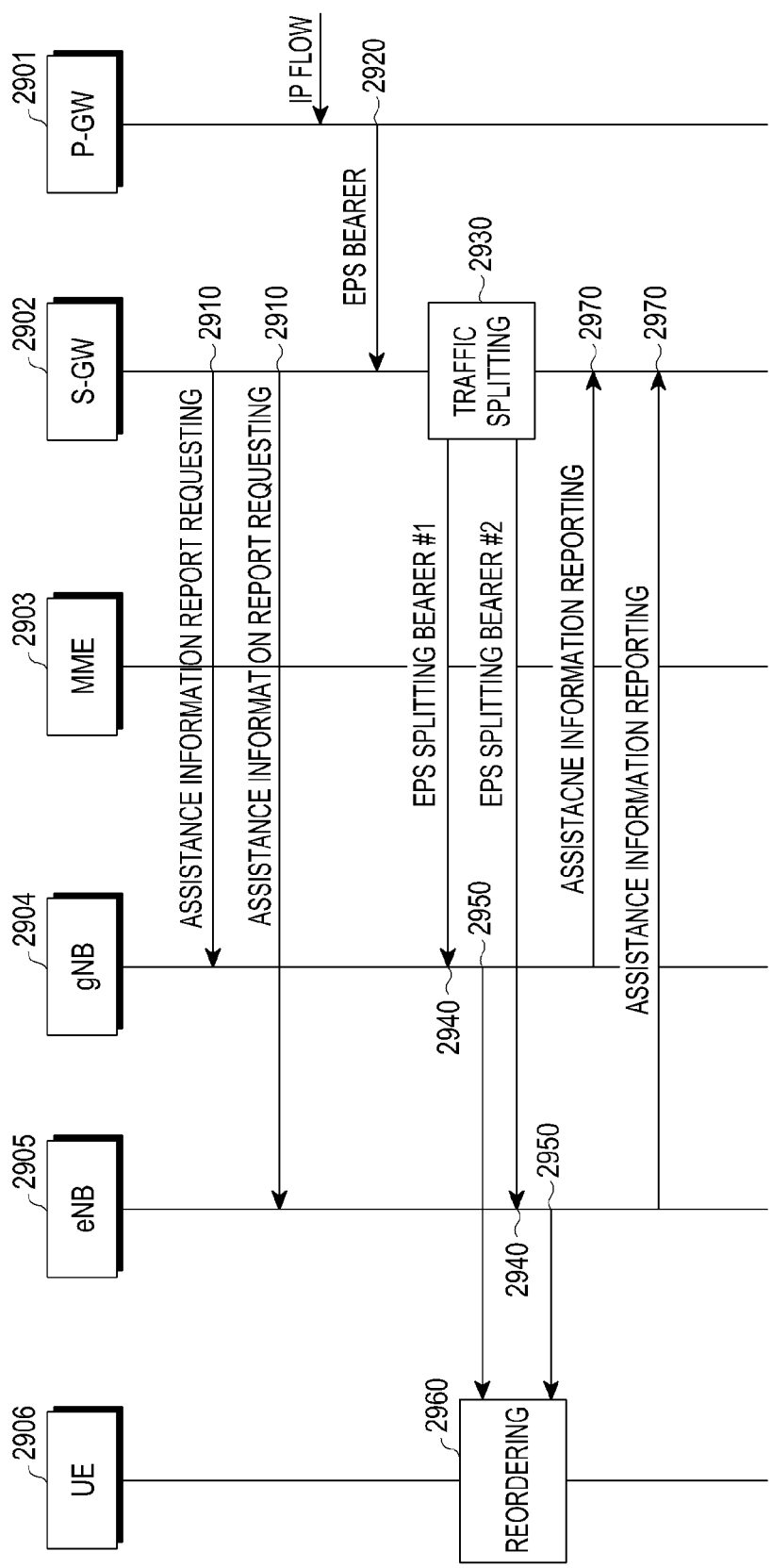
FIG. 29 is a flowchart illustrating the seventh embodiment associated with report requesting to a RAN node, traffic splitting at gateway, and assistance information direct reporting of a RAN node according to another aspect of the present disclosure.

FIG. 29 is a flowchart illustrating the seventh embodiment associated with report requesting to a RAN node, traffic splitting at gateway, and assistance information direct reporting of a RAN node according to another aspect of the present disclosure. Meanwhile, FIG. 29 illustrates an embodiment in which traffic splitting 2930 is performed in an S-GW 2902. However, this is merely an example, and traffic splitting 2930 may be performed in a different type of gateway other than the S-GW 2902.

In the seventh embodiment in which the S-GW 2902 performs traffic splitting, the S-GW 2902 transmits a report configuration (or report requesting) message to eNBs 2904 and 2905 via an S1-U interface in operation 2910. In addition, the eNBs 2904 and 2905 report the requested assistance information to the S-GW 2902 in operation 2970. The present embodiment (seventh embodiment) is obtained by replacing the UPF 1701 with the S-GW 2902 in the second embodiment described above with reference to FIGS. 18 and 19.

Meanwhile, operations 2910 to 2970 of FIG. 29 may be performed in the same manner as operations 1711 to 1741 in FIG. 17.

The contents according to an eighth embodiment implementing traffic splitting at S-GW, report configuration via MME and direct reporting are as follows.

Figure 30:
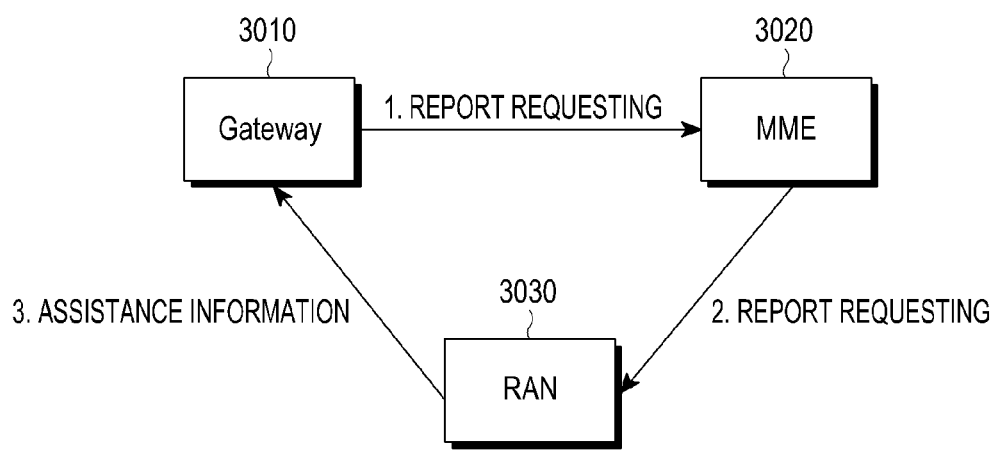
FIG. 30 is an exemplary embodiment illustrating an eighth embodiment associated with report requesting via mobility management entity (MME), traffic splitting at gateway, and assistance information direct reporting of a RAN node according to another aspect of the present disclosure.

FIG. 30 is an exemplary embodiment illustrating the eighth embodiment associated with report requesting via mobility management entity (MME), traffic splitting at gateway, and assistance information direct reporting of RAN node according to another aspect of the present disclosure. Here, a gateway 3010 starts an assistance report configuration for a RAN 3030 via an MME 3020 and receives an assistance report directly from the RAN 3030.

Figure 31:
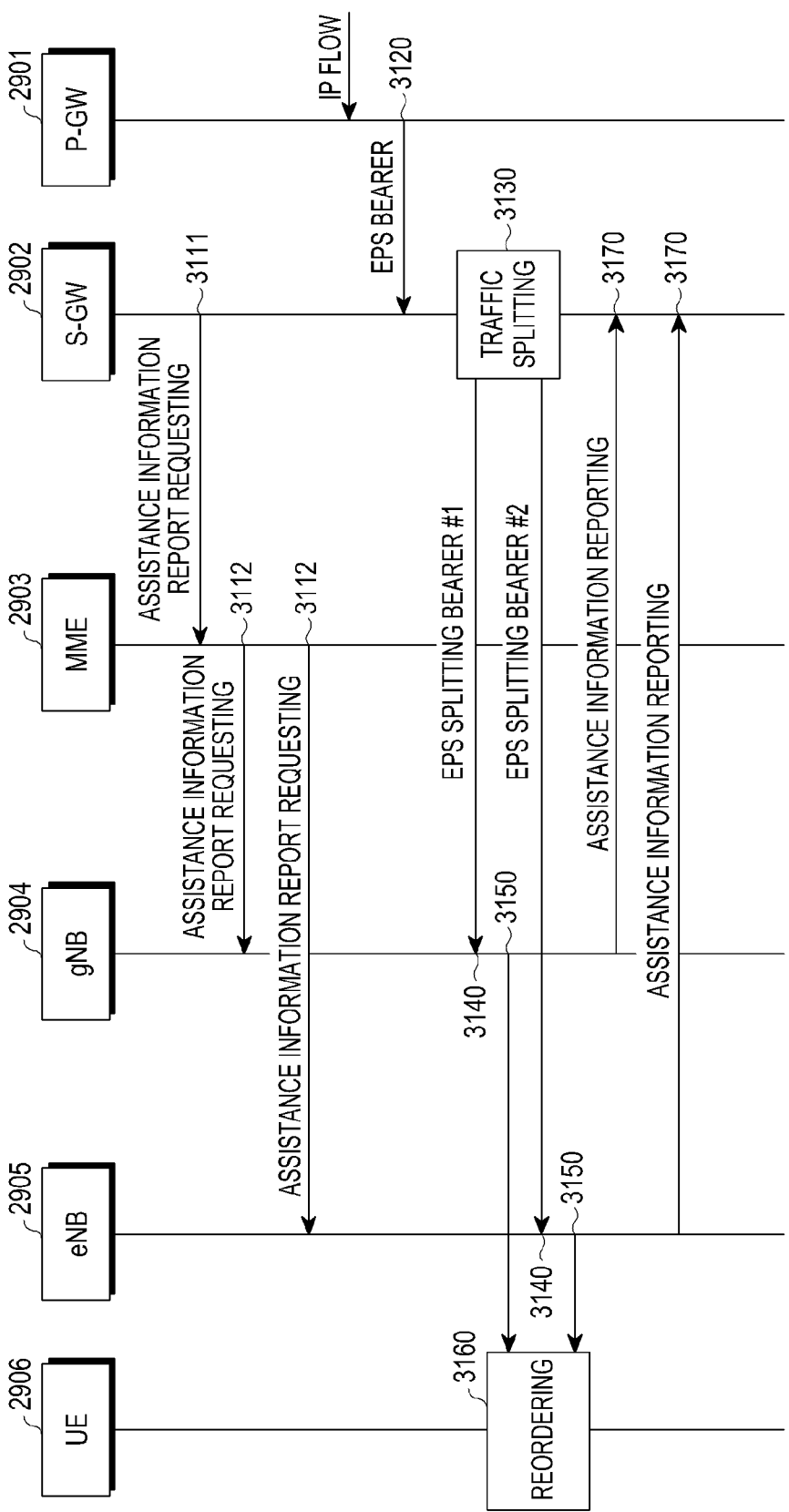
FIG. 31 is a flowchart illustrating the eighth embodiment associated with report requesting via mobility management entity (MME), traffic splitting at gateway, and assistance information direct reporting of a RAN node according to another aspect of the present disclosure.

FIG. 31 is a flowchart illustrating the eighth embodiment associated with report requesting via mobility management entity (MME), traffic splitting at gateway, and assistance information direct reporting of a RAN node according to another aspect of the present disclosure. Meanwhile, FIG. 31 illustrates a case in which traffic splitting 3130 is performed in the S-GW 2902, but this is merely an example. Traffic splitting 3130 may be performed in a different type of gateway other than the S-GW 2902.

The eighth embodiment may be obtained by replacing the UPF with the S-GW 2902, the gNB with the eNBs 2904 and 2905, and the AMF with an MME 2903 in the first embodiment described above with reference to FIGS. 16 and 17. In addition, the S-GW 2902 makes an assistance information report request from the MME 2903 instead of the SMF. Therefore, in the eighth embodiment, the SMF is not included in the assistance information report requesting procedures.

Meanwhile, operations 3111, 3112, and 3130 to 3170 of FIG. 31 may be performed in the same manner as operations 1711 to 1741 in FIG. 17.

The contents according to a ninth embodiment (traffic splitting at S-GW, report configuration via MME and reporting via MME) are as follows.

Figure 32:
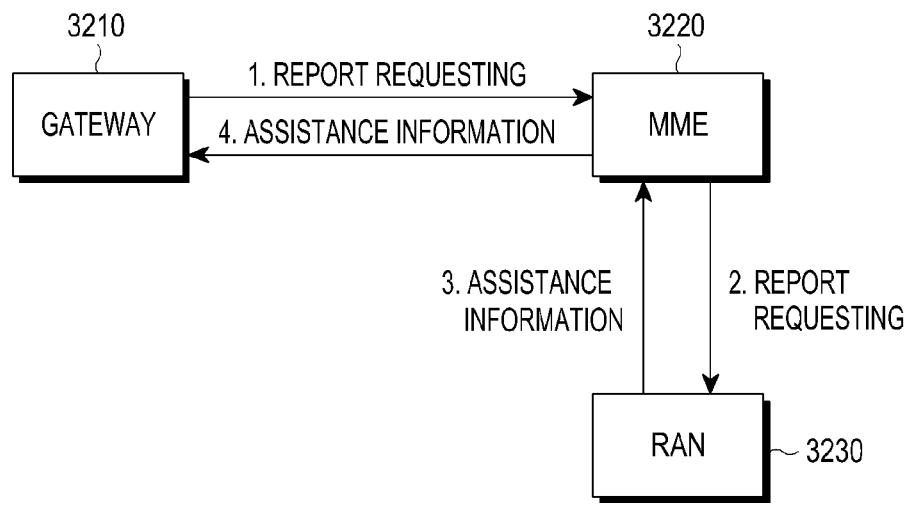
FIG. 32 is an exemplary embodiment illustrating a ninth embodiment associated with report requesting via MME, traffic splitting at gateway, and assistance information reporting via MME according to another aspect of the present disclosure.

FIG. 32 is an exemplary embodiment illustrating a ninth embodiment associated with report requesting via MME, traffic splitting at gateway, and assistance information reporting via MME according to another aspect of the present disclosure. Here, a gateway 3210 starts an assistance report configuration (or report requesting) for a RAN 3230 via an MME 3220 and receives the assistance report from the RAN 3230 via the MME 3220.

Figure 33:
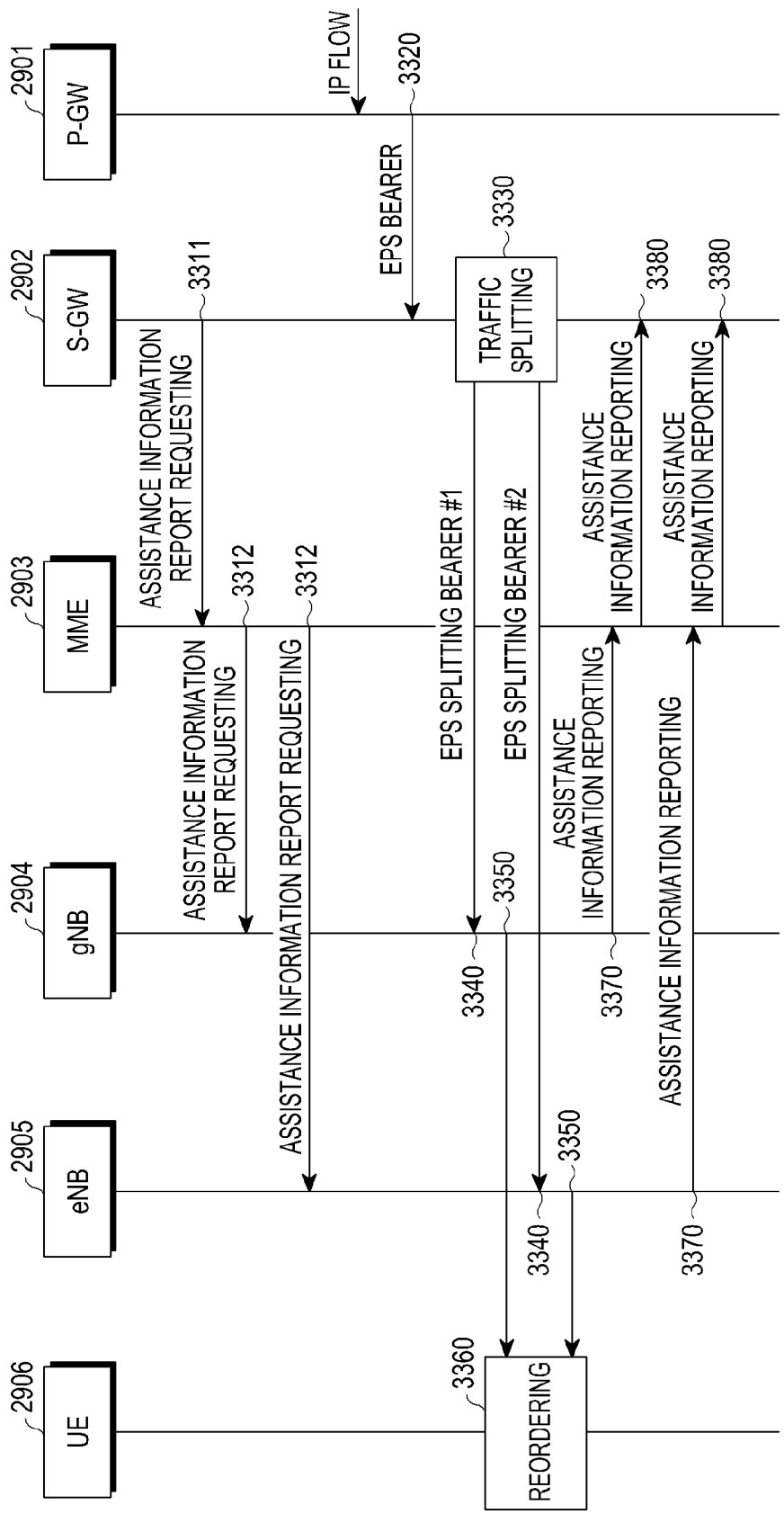
FIG. 33 is a flowchart illustrating the ninth embodiment associated with report requesting via MME, traffic splitting at gateway, and assistance information reporting via MME according to another aspect of the present disclosure.

FIG. 33 is a flowchart illustrating the ninth embodiment associated with report requesting via MME, traffic splitting at gateway, and assistance information reporting via MME according to another aspect of the present disclosure. Meanwhile, FIG. 33 illustrates a case in which traffic splitting 3330 is performed in the S-GW 2902, but this is merely an example. Traffic splitting 3330 may be performed even in a different type of gateway other than the S-GW 2902.

The ninth embodiment may be obtained by replacing the UPF with the S-GW 2902, a gNB with the eNBs 2904 and 2905, and the AMF with the MME 2903. In addition, the S-GW 2902 makes an assistance information report request from the MME 2903 instead of the SMF. Therefore, in the ninth embodiment, the SMF does not perform the assistance information report requesting procedures.

Meanwhile, operations 3311 to 3380 of FIG. 33 may be performed in the same manner as operations 2110 to 2190 of FIG. 21.

Information elements of report requesting (reporting configuration) transmitted by a report requesting entity according to another aspect of the present disclosure have the following configuration. Meanwhile, the report requesting entity may be the report requesting entity 1510 of FIG. 15, and may correspond to an entity that performs report requesting in FIGS. 16 to 33.

The assistance information report request (report request message) may be propagated to a plurality of RAN nodes, and the assistance information report may also be propagated to a plurality of RAN nodes. For example, the assistance information report request may be propagated from the UPF to the AMF to the RAN node, and the assistance information report may be propagated from the RAN to the AMF and propagated from the AMF to the UPF as illustrated in FIG. 20. To support this case, the report request message may contain a list of at least one set of the information elements described below. Here, each set of the information elements corresponds to a configuration applied to the related network node.

For example, the report requesting of the above-described third embodiment as illustrated in FIGS. 20 and 21 may include two report configuration (or report requesting) entries as follows.

1) Report requesting entry for RAN; including report triggering condition for performing report from RAN to AMF, destination of report (e.g., AMF), etc.
2) Report requesting entry for AMF; including report triggering condition for performing report from AMF to UPF, destination of report (e.g., UPF), etc.

The report requesting entry may include the following information element (IE).

TABLE 1

Related network node: identify which network node should apply the proposed IE set
Report triggering condition: designate when report node is to transmit report, configure event-based report or periodic report
Report target: indicate network node ID to which report node should transmit triggered report
Traffic flow identification information: identify traffic flow to which report configuration (or report requesting) is applied. Explicitly indicate specific traffic flow. Does not explicitly indicate specific traffic flow, but indicate that report configuration (or report requesting) should be applied to all traffic flows regarded as splitting bearer. Meanwhile, as an example, the traffic flow identification information may further include the following information elements: 1) UE identifier (ID); identify UE with which assistance information report is associated 2) Traffic flow ID; identify traffic flow ID of UE identified as UE ID. The traffic flow ID may be a bearer ID. 3) Meanwhile, report request may be applied only to the traffic flows that are mutually identified by the UE ID and the traffic flow ID.
Reported contents: specifies elements of assistance information that a report message should be included as part of assistance information report. When the IE (i.e., reported content) is not included, the report message should include all assistance information measured/collected as part of the assistance information reporting procedures.
Minimum reporting interval: specifies a minimum time interval of successive assistance information reports to suppress significantly frequent reports. When two or more reports are executed in one report period, only the latest report may be transmitted.
Assistance information processing: designate method of reporting and evaluating measured report triggering information type and processing the same before it is used for report.

Meanwhile, the assistance information processing among the IEs in Table 1 may indicate how to process the assistance information. For example, an exponential moving average (EMA) method, a time-window based moving average (TWMA) method, and a sample-window based moving average (SWMA) method may be designated. The above methods are specifically as follows.

TABLE 2

EMA: in a case of n time with respect to an instantaneous measurement value $m(n)$, a mean value at n time can be calculated as $m(n) = (1 - \alpha) * m(n - 1) + \alpha * m(n)$. Here, $\alpha$ may have a value of 0 or larger and less than 1. As an example, $\alpha$ may be set as a significantly small value, for example, 0.01.
TWMA; performed by taking a sample mean of a variable number of the latest measurements measured in a fixed time window.
SWMA; performed by taking a sample mean of a fixed number of the latest measurements.

Since EMA, TWMA, and SWMA are averaging methods, and may calculate a mean value of various types of data using the corresponding averaging method.

Meanwhile, when nothing is specified by the assistance information processing, it may indicate that an instantaneous value of the report triggering information element is used. That is, nothing may be a case in which the above averaging methods are not used, and may report the instantaneous value when the assistance information is reported. Meanwhile, the mean value calculated by the averaging methods may be a mean value of a plurality of instantaneous values.

When a report triggering condition is an event-based trigger report, the report configuration (or report requesting) entry may include the following IEs.

TABLE 3

Report triggering information type; indicate one of elements in an assistance information set.
Report triggering event; designate condition for when the reporting entity provides report.

The report triggering event field indicates one or more events. When at least one event condition is satisfied, the reporting entity transmits a report. Meanwhile, the following events can be defined. For example, a case where a previously reported value is larger than a current value (Event 1), a case where the previously reported value is smaller than the current value (Event 2), a case where the previously reported value is larger than or smaller than the current value (Event 3), a case where the current value is larger than a predetermined value (event 4), a case where the current value is smaller than a predetermined value (event 5), and the like may be defined. The values used in the above events may be predefined or configured by the report requesting entity 1510.

When the report triggering condition is a periodic report, the IE of the report requesting entry may include at least one of a reporting period and a reporting interval necessary for the reporting entity to trigger the report.

A method of dynamically determining a traffic splitting ratio according to another aspect of the present disclosure is as follows. Meanwhile, the determination of the traffic splitting ratio below may be performed by the traffic splitting entity 1540 of FIG. 15 and may be performed by an entity performing traffic splitting in FIGS. 16 to 33.

The traffic splitting entity 1540 may split one traffic flow (IP flow) into a plurality of sub-flows. For traffic splitting, first, the traffic splitting ratio of each path is determined. The traffic splitting ratio may be calculated using Equation 1 below, which may indicate the traffic splitting ratio of a path i in Equation 1.

$$\eta_i = \frac{\text{Amount of traffic transmitted via path } i}{\text{Amount of traffic entering } TSRL} \text{ and } \sum_j \eta_j = 1 \quad [\text{Equation 1}]$$

In the present disclosure, two methods such as traffic splitting ratio based on sum-differential performance (TSR-SD) and traffic splitting ratio based on sum ratio performance (TSR-SR) are provided as a method of determining the traffic splitting ratio.

The TSR-SD uses difference metric defined as $\hat{m}_i - m_i$. Here, $m_i$ denotes the current performance or characteristic of the path i, and $\hat{m}_i$ denotes a target maximum of $m_i$. This type of algorithm may be applied when a value is minimized with strict limits on the relevant performance metric. The traffic splitting ratio of the path i may be calculated using Equation 2 below.

$$\eta_i = \frac{w_i(\hat{m}_i - m_i)^\alpha}{\sum_j w_j(\hat{m}_j - m_j)^\alpha} \quad [\text{Equation 2}]$$

The TSR-SD uses ratio metric defined as $\hat{m}_i/m_i$. Here, $m_i$ denotes the current performance or characteristic of the path i, and $\hat{m}_i$ denotes a target value of $m_i$. This type of algorithm may be applied when an interesting performance indicator is desired to be maintained as close as possible to a target value. The traffic splitting ratio of the path i may be calculated using Equation 3 below.

$$\eta_i = \frac{w_i(\hat{m}_i/m_i)^\alpha}{\sum_j w_j(\hat{m}_j/m_j)^\alpha} \quad [\text{Equation 3}]$$

Since multiple paths share the traffic flow from a common traffic source, an arrival rate of the received traffic for each path is not independent. For example, when an amount of traffic flow in any one path is reduced, at least another traffic flow amount is increased. In a figurative sense, we can see this situation as a zero-sum game where each path acts as a player. When a player gets a high payout, we can find at least one player who gets a smaller payout. In this case, one possible strategy when determining the traffic splitting ratio between multiple paths is to measure the satisfaction level of each path and then to take action that prefers a less satisfactory path. Then, the next strategy is to find a balanced operating point by constantly responding to changes in the performance of each path. The algorithm presented below is based on this strategy.

In the case of the TSR-SD, an algorithm for distributing the queue size of each path to multiple paths while minimizing the queue size of each path is provided. It is assumed that $\hat{q}_i$ is the queue size of the path i and $q_i(n)$ is the queue size of the path i measured at n time. Then, a traffic splitting ratio calculated at n+1 time may be calculated using Equation 4 below.

$$\eta_i(n+1) = \frac{w_i Q_i^a(n)}{\sum_j w_j Q_j^a(n)} \quad [\text{Equation 4}]$$

where $m(n) = (1-a)*m(n-1) + a*m(n)$ $a \geq 1, w_i \geq 0$ for all $i$

There are two parameters a and w that can be applied to each path. a determines an increase rate or a decrease rate of $Q^\alpha$, and w determines the level of contribution of.

As $q_i$ becomes closer to $\hat{q}$, $Q_i$ becomes smaller, which makes $\eta_i$ smaller. A small $\eta_i(n+1)$ causes the traffic splitting entity 1540 to allocate a smaller amount of traffic flow at n+1 time than that at n time. When the other conditions are fixed, the small $\eta_i(n+1)$ may reduce the queue size of the path i.

For the TSR-SD performance, we provide an algorithm that balances the delay of each path between multiple paths while minimizing the delay of each path. It is assumed that is a maximum delay of the path i and $d_i(n)$ is the queue size of the path i measured at n time. Then, the traffic splitting ratio $\eta_i(n+1)$ of n+1 time may be calculated using Equation 5 below.

$$\eta_i(n+1) = \frac{w_i D_i^a(n)}{\sum_j w_j D_j^a(n)} \text{ where } D_j = \max\{\hat{d}_j - d_j, \varepsilon\} \quad \text{[Equation 5]}$$

As $d_i$ becomes closer to $\hat{d}_i$, $D_i$ becomes smaller, which makes smaller. A smaller $\eta_i(n+1)$ causes the traffic splitting entity 1540 to allocate a smaller amount of traffic flow at n+1 time than that at n time. When the other conditions are fixed, the small $\eta_i(n+1)$ may reduce the delay time of the path i.

For the TSR-SR performance, we provide an algorithm that balances the throughput of each path between multiple paths while minimizing a deviation of $r_i$ and $\hat{r}_i$. It is assumed that $\hat{r}_i$ is a target throughput of the path i and $r_i(n)$ is a throughput of the path i measured at n time. Then, the traffic splitting ratio of n+1 time may be calculated using Equations 6 and 7 below.

$$\eta_i(n) = \frac{w_i\left(\frac{\hat{r}_i}{r_i(n)}\right)}{\sum_j w_j\left(\frac{\hat{r}_j}{r_j(n)}\right)} \quad \text{[Equation 6]}$$

$$\eta_i(n) = \frac{w_i\left(\frac{\hat{r}_i}{r_i(n)}\right)^a}{\sum_j w_j\left(\frac{\hat{r}_j}{r_j(n)}\right)^a} \quad \text{[Equation 7]}$$

A packet routing method according to another aspect of the present disclosure is as follows.

The traffic splitting entity may determine a path to be used for each packet after determining the traffic splitting ratios for all the paths. This may be the same as the routing of packet in a buffer of the traffic splitting entity with multiple paths. Meanwhile, the traffic splitting entity may be the traffic splitting entity 1540 in FIG. 15, and may correspond to an entity that performs traffic splitting in FIGS. 16 to 33.

As described above, the TSRL of the present disclosure establishes an SN to transmit each incoming packet, and the importance of the routing of each packet through the path is that the routing of the packet determines the SN of the packet used for reordering. When the path for each packet is determined, a reordering function that a receiving entity can apply to the packet received from the multiple paths may be considered. When sequence reordering is applied at a reception side, the routing through the multiple paths at the traffic splitting entity 1540 may minimize reordering failures.

When a plurality of paths are used, a routing algorithm for reducing reordering failures is provided as follows:

1) Estimate a transmission delay. Estimate a transmission delay $t_i$ of the path i. The transmission delay is defined as the duration from the moment the packet is transmitted by the traffic splitting entity to the moment the reordering entity at the reception side corresponding to the path i receives the packet.

2) Depending on the estimated transmission delay, the order is determined as follows:

$p=\mathrm{argmin}_i(t_i), q=\mathrm{argmax}_i(t_i)$

3) Perform packet routing in the following method.

TABLE 4 if $(t_q-t_p)>$ threshold
   Allocate first $\eta_p M$ packets to path p
   Allocate first $\eta_q M$ packets to path q
else
   Allocate each packet to path p, q randomly such that path p is
   selected with a probability $\eta_p$ and path q with probability $\eta_q$.

In table 4, M denotes the number of packets to be routed, which is stored in the buffer of the traffic splitting entity 1540. Here, the packets stored in the buffer are numbered sequentially such as 0, 1, 2, . . . , and M−1, and packet 0 is a head of line (HOL) packet.

The number M of packets buffered in the traffic splitting entity 1540 may be a configurable parameter. As the value of M increases, a ratio of the amount of traffic to be transmitted to each path may become close to as determined in the traffic splitting ratio determining algorithm, but a latency until the M packets are collected may become longer. In order to handle the case of experiencing a long delay by waiting until M packets are accumulated in the traffic splitting entity 1540, when a waiting delay time of a packet exceeds a threshold value, the traffic splitting entity 1540 is set to start routing. The threshold value may be preset or may be changed flexibly according to the network conditions.

Figure 34:
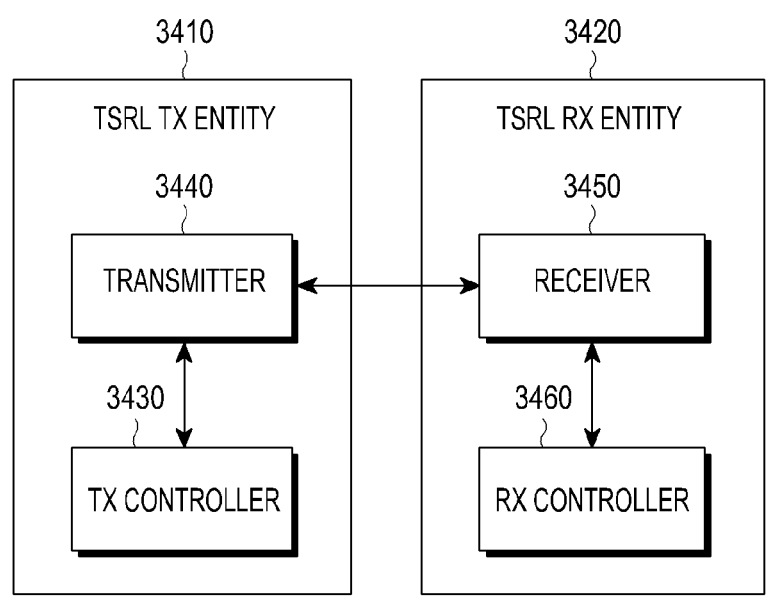
FIG. 34 is a block diagram illustrating one embodiment of a wireless communication system according to another aspect of the present disclosure.

FIG. 34 is an exemplary block diagram illustrating one embodiment of a wireless communication system according to another aspect of the present disclosure.

As illustrated in FIG. 34, the wireless communication system may include a TSRL TX entity 3410 and a TSRL RX entity 3420. Here, the TSRL TX entity 3410 may include a TX controller 3430 and a transmitter 3440 and the TSRL RX entity may include a receiver 3450 and an RX controller 3460. For example, the transmitter 3440 and the receiver 3450 may be a transceiver for transmitting and receiving data, and the TX controller 3430 and the RX controller 3460 may be configured as a combination of at least one of a controller, a processor, and a CPU.

Meanwhile, the TSRL TX entity 3410 may be a core network entity (e.g., S-GW or UPF) in case of DL or may be a UE in case of UL. In addition, the TSRL RX entity 3420 may be a UE in case of DL or may be a core network entity in case of UL.

For example, the TX controller 3430 may perform a traffic splitting function, and the RX controller 3460 may perform a function of reordering packets split by the traffic splitting.

Figure 35:
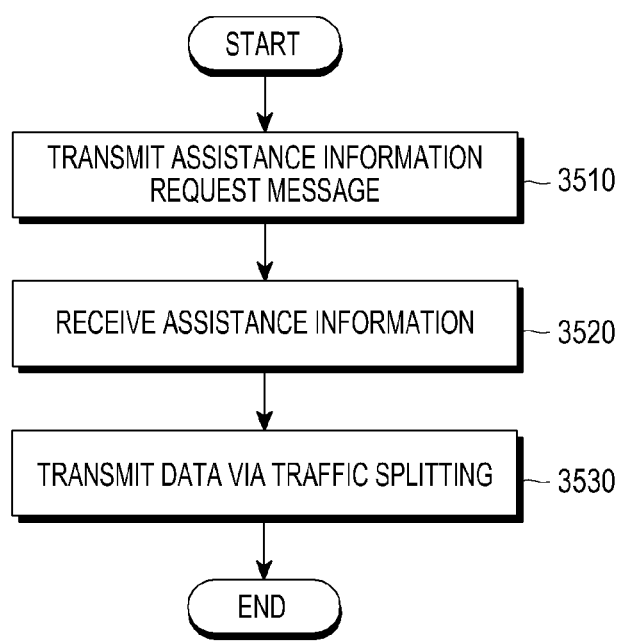
FIG. 35 is a flowchart illustrating one embodiment of a method of transmitting traffic data of a wireless communication system according to another aspect of the present disclosure.

FIG. 35 is a flowchart illustrating one embodiment of a method of transmitting traffic data of a wireless communication system according to another aspect of the present disclosure.

As illustrated in FIGS. 34 and 35, the method of FIG. 35 may be performed by the TSRL TX entity 3410 of FIG. 34. However, an operation subject is not limited thereto.

In operation 3510, the TSRL TX entity 3410 may transmit an assistance information request message.

In operation 3520, the TSRL TX entity 3410 may receive assistance information.

In operation 3530, the TSRL TX entity 3410 performs a traffic splitting function and may transmit data.

Figure 36:
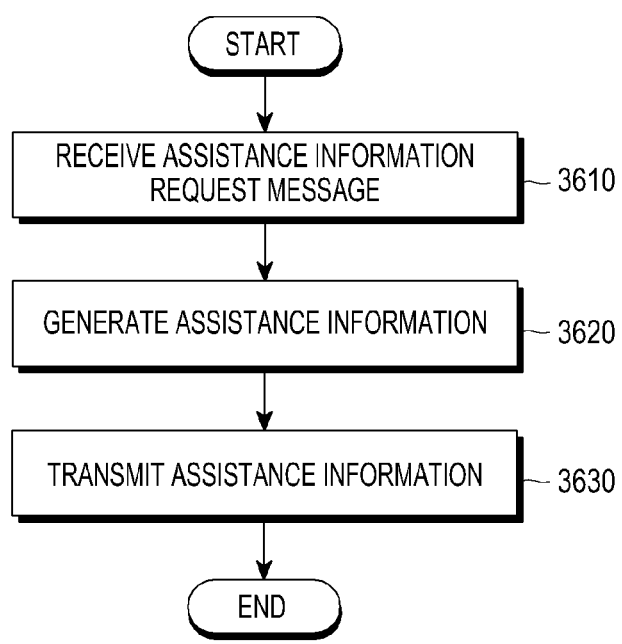
FIG. 36 is a flowchart illustrating one embodiment of a method of relaying traffic data of a wireless communication system according to another aspect of the present disclosure.

FIG. 36 is a flowchart illustrating one embodiment of a method of relaying traffic data of a wireless communication system according to another aspect of the present disclosure.

As an example, the method of FIG. 36 may be performed by an eNB. However, an operation subject is not limited thereto, and may be any entity that acts as a relay between the TSRL TX entity and the TSRL RX entity. Hereinafter, for convenience of description, it is assumed that a subject for the method of FIG. 36 is a base station.

In operation 3610, the base station may receive an assistance information request message from the TSRL TX entity.

In operation 3620, the base station may generate assistance information.

In operation 3630, the base station may transmit the assistance information to the TSRL TX entity.

Although not illustrated in FIG. 36, when the TSRL TX entity transmits split data to the base station, the split data may be transmitted to the TSRL RX entity.

Figure 37:
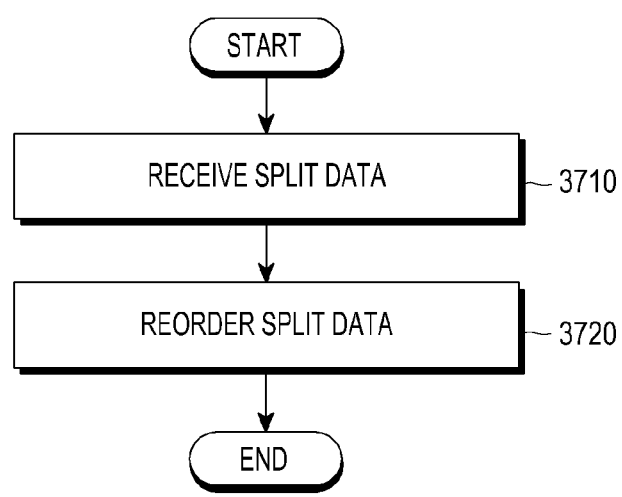
FIG. 37 is a flowchart illustrating one embodiment of a method of receiving traffic data of a wireless communication system according to another aspect of the present disclosure.

FIG. 37 is a flowchart illustrating one embodiment of a method of receiving traffic data of a wireless communication system according to another aspect of the present disclosure.

As illustrated in FIGS. 34 and 37, the method of FIG. 37 may be performed by the TSRL RX entity 3420 of FIG. 34. However, an operation subject is not limited thereto.

In operation 3710, the TSRL RX entity 3420 may receive split data.

In operation 3720, the TSRL RX entity 3420 may reorder the received split data.

The above-described operations may be realized by providing a memory device storing a corresponding program code in an arbitrary component within the TSRL TX entity or the TSRL RX entity of the communication system. That is, the controller of the TSRL TX entity or the TSRL RX entity may execute the above-described operations by reading and executing the program code stored in the memory device by a processor or a central processing unit (CPU).

The entity, the function, the base station, the load manager, various structural elements of the terminal, modules and the like may be operated by using a hardware circuit, e.g, a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for processing traffic by a core network entity, the method comprising:
   transmitting, to at least one base station, a message for requesting assistance information;
   receiving, from the at least one base station, the assistance information;
   splitting packets based on sequence numbers of the packets; and
   transmitting the split packets to base stations,
   wherein at least one first packet that satisfies a first criterion for the sequence numbers is transmitted to a first base station among the base stations, and at least one second packet that satisfies a second criterion for the sequence numbers is transmitted to a second base station among the base stations.

2. The method of claim 1, wherein the core network entity is a gateway or a user plane function (UPF).

3. The method of claim 1, wherein the splitting of the packets is implemented by a traffic splitting and reordering layer (TSRL) of the core network entity.

4. The method of claim 1, wherein the assistance information includes at least one of a transmission delay time, a queue size, or a throughput.

5. The method of claim 1, further comprising:
   determining a split ratio for splitting the packets based on the received assistance information.

6. The method of claim 1, further comprising:
   transmitting information indicating sequence numbers associated with the splitting of the packets.

7. A core network entity for processing traffic, comprising:
   a transceiver; and
   a processor configured to:
      control the transceiver to transmit, to at least one base station, a message for requesting assistance information,
      control the transceiver to receive, from the at least one base station, assistance information,
      split packets based on sequence numbers of the packets, and
      control the transceiver to transmit the split packets to base stations,
      wherein at least one first packet that satisfies a first criterion for the sequence numbers is transmitted to a first base station among the base stations, and at least one second packet that satisfies a second criterion for the sequence numbers is transmitted to a second base station among the base stations.

8. The core network entity of claim 7, wherein the core network entity is a gateway or a UPF.

9. The core network entity of claim 7, wherein the processor is further configured to:
   split the packets using a traffic splitting and reordering layer (TSRL) of the core network entity.

10. The core network entity of claim 7, wherein the assistance information includes at least one of a transmission delay time, a queue size, or a throughput.

11. The core network entity of claim 7, wherein the processor is further configured to:
   determine a split ratio for splitting the packets based on the received assistance information.

12. The core network entity of claim 7, wherein the transmitted split packets further includes information indicating sequence numbers associated with the splitting of the packets.

13. A method for supporting a traffic flow management, by a first base station, in a wireless network system, the method comprising:
   receiving, from a core network entity, a message for requesting assistance information to be used for splitting traffic;
   generating the assistance information in response to the received message for requesting assistance information;
   transmitting, to the core network entity, the generated assistance information; and
   receiving data from the core network entity through the split traffic, wherein the data is transmitted to base stations based on the assistance information, wherein the data includes packets split based on sequence numbers of the packets, and wherein at least one first packet that satisfies a first criterion for the sequence numbers is transmitted to a first base station among the base stations, and at least one second packet that satisfies a second criterion for the sequence numbers is transmitted to a second base station among the base stations.

14. The method of claim 13, further comprising:
transmitting, to a user equipment (UE), the received data through the split traffic.

15. The method of claim 14, wherein packet splitting is implemented by a traffic splitting and reordering layer (TSRL) of the core network entity.

16. The method of claim 14, wherein the split packets are reordered by a traffic splitting and reordering layer (TSRL) of the UE.

17. A first base station supporting a traffic flow management in a wireless network system, the first base station comprising:
a transceiver; and
a processor configured to:
control the transceiver to receive, from a core network entity, a message for requesting assistance information to be used for splitting traffic,
generate the assistance information in response to the received message for requesting assistance information,
control the transceiver to transmit to the core network entity, the generated assistance information, and
control the transceiver to receive data from the core network entity through the split traffic,
wherein the data is transmitted to base stations based on the assistance information,
wherein the data includes packets split based on sequence numbers of the packets, and
wherein at least one first packet that satisfies a first criterion for the sequence numbers is transmitted to a first base station among the base stations, and at least one second packet that satisfies a second criterion for the sequence numbers is transmitted to a second base station among the base stations.

18. The first base station of claim 17, wherein the processor is further configured to control the transceiver to:
transmit, to a user equipment (UE), the received data through the split traffic.

19. The first base station of claim 17, wherein packet splitting is implemented by a traffic splitting and reordering layer (TSRL) of the core network entity.

20. The first base station of claim 18, wherein the split packets are reordered by a traffic splitting and reordering layer (TSRL) of the UE.

* * * * *